(12) United States Patent  
Evans et al.

(10) Patent No.: US 8,705,942 B2  
(45) Date of Patent: Apr. 22, 2014

(54) METHODS AND SYSTEMS FOR PROCESSING DIGITAL DATA RATE AND DIRECTIONAL PLAYBACK CHANGES

(75) Inventors: Glenn F. Evans, Kirkland, WA (US); Alok Chakrabarti, Bellevue, WA (US); Matthijs A. Gates, Wellesley, MA (US)

(73) Assignee: Microsoft Corporation, Redmond, WA (US)

( * ) Notice: Subject to any disclaimer, the term of this patent is extended or adjusted under 35 U.S.C. 154(b) by 78 days.

(21) Appl. No.: 13/370,613

(22) Filed: Feb. 10, 2012

(65) Prior Publication Data

US 2012/0141090 A1  Jun. 7, 2012

Related U.S. Application Data

(63) Continuation of application No. 10/419,622, filed on Apr. 21, 2003, now Pat. No. 8,169,345, which is a continuation of application No. 10/185,800, filed on Jun. 28, 2002, now Pat. No. 7,496,283.

(51) Int. Cl.  
  *G11B 27/00* (2006.01)  
  *G11B 27/034* (2006.01)

(52) U.S. Cl.  
  CPC .................................. *G11B 27/034* (2013.01)  
  USPC ......... 386/278; 370/509; 348/423.1; 348/500

(58) Field of Classification Search  
  CPC ....................................................... G11B 27/034  
  USPC ................. 386/241, 248, 278–288; 725/34; 348/384.1, 423.1, 500, 515, 722; 375/240.03, 240.05, 240.26, 240.28; 370/487, 498, 513, 510, 509  
  See application file for complete search history.

(56) References Cited

U.S. PATENT DOCUMENTS

| 4,661,862 | A | 4/1987 | Thompson |
| 4,689,697 | A | 8/1987 | Wilkinson |
| 5,193,004 | A | 3/1993 | Wang et al. |
| 5,298,992 | A | 3/1994 | Pietras et al. |

(Continued)

FOREIGN PATENT DOCUMENTS

| EP | 0605115 | 7/1994 |
| EP | 0653884 | 5/1995 |

(Continued)

OTHER PUBLICATIONS

Non-Final Office Action for U.S. Appl. No. 10/419,622, mailed on Jul. 8, 2011, Glenn F. Evans, et al., "Methods and Systems for Processing Digital Data Rate and Directional Playback Changes", 8 pages.

(Continued)

*Primary Examiner* — Thai Tran  
*Assistant Examiner* — Mishawn Dunn  
(74) *Attorney, Agent, or Firm* — Carole A. Boelitz; Micky Minhas; Lee & Hayes, PLLC

(57) ABSTRACT

Various methods and systems permit digital data, such as video data, audio/video data, audio/video/subpicture data and the like, to be processed in a manner that permits playback at different speeds in both forward and reverse directions. Various embodiments are also directed to handling playback rate changes in a manner that can enhance the experience of a user.

14 Claims, 17 Drawing Sheets

(56) References Cited

U.S. PATENT DOCUMENTS

| | | | |
|---|---|---|---|
| 5,341,474 A | 8/1994 | Gelman et al. | |
| 5,377,051 A | 12/1994 | Lane et al. | |
| 5,414,455 A | 5/1995 | Hooper et al. | |
| 5,535,008 A | 7/1996 | Yamagishi et al. | |
| 5,574,566 A | 11/1996 | Takakura et al. | |
| 5,694,172 A | 12/1997 | Miyano | |
| 5,892,882 A | 4/1999 | Kuroda et al. | |
| 5,913,038 A | 6/1999 | Griffiths | |
| 5,936,968 A * | 8/1999 | Lyons | 370/503 |
| 5,959,796 A | 9/1999 | Matsumi et al. | |
| 5,974,224 A | 10/1999 | Nagata | |
| 6,014,706 A | 1/2000 | Cannon et al. | |
| 6,058,241 A | 5/2000 | Kawamura et al. | |
| 6,101,070 A | 8/2000 | Oguro | |
| 6,167,083 A | 12/2000 | Sporer et al. | |
| 6,179,489 B1 | 1/2001 | So et al. | |
| 6,181,383 B1 * | 1/2001 | Fox et al. | 348/515 |
| 6,201,927 B1 | 3/2001 | Comer | |
| 6,247,072 B1 | 6/2001 | Firestone | |
| 6,262,776 B1 | 7/2001 | Griffits | |
| 6,269,117 B1 | 7/2001 | Peng | |
| 6,327,421 B1 | 12/2001 | Tiwari et al. | |
| 6,380,983 B1 | 4/2002 | Miyazaki et al. | |
| 6,473,558 B1 | 10/2002 | Wu et al. | |
| 6,507,615 B1 | 1/2003 | Tsujii et al. | |
| 6,611,624 B1 * | 8/2003 | Zhang et al. | 382/232 |
| 6,646,195 B1 | 11/2003 | Puryear | |
| 6,654,539 B1 | 11/2003 | Duruoz et al. | |
| 6,785,462 B1 | 8/2004 | Yamaoka | |
| 6,806,909 B1 * | 10/2004 | Radha et al. | 348/384.1 |
| 6,993,081 B1 * | 1/2006 | Brunheroto et al. | 375/240.28 |
| 2001/0009608 A1 | 7/2001 | Tanaka et al. | |
| 2002/0015577 A1 | 2/2002 | Negishi et al. | |
| 2002/0087976 A1 * | 7/2002 | Kaplan et al. | 725/34 |
| 2002/0154694 A1 * | 10/2002 | Birch | 375/240.05 |
| 2002/0181588 A1 | 12/2002 | Okada | |
| 2003/0007556 A1 | 1/2003 | Oura et al. | |
| 2003/0093801 A1 | 5/2003 | Lin et al. | |
| 2004/0001695 A1 | 1/2004 | Evans et al. | |
| 2004/0179597 A1 | 9/2004 | Rault | |

FOREIGN PATENT DOCUMENTS

| | | |
|---|---|---|
| EP | 0676898 | 10/1995 |
| EP | 1387579 | 2/2004 |
| JP | 2110783 | 4/1990 |
| JP | 7202933 | 8/1995 |
| JP | 264542 | 10/1995 |
| JP | 7264542 | 10/1995 |
| JP | 7284042 | 10/1995 |
| JP | 8102913 | 4/1996 |
| JP | 8130707 | 5/1996 |
| JP | 8214260 | 8/1996 |
| JP | 8280024 | 10/1996 |
| JP | 9282166 | 10/1997 |
| JP | 11039177 | 2/1999 |
| JP | 2000148639 A | 5/2000 |
| JP | 2001359060 A | 12/2001 |
| JP | 2002010213 | 1/2002 |
| JP | 2002112193 A | 4/2002 |
| JP | 2002529024 | 9/2002 |
| JP | 2003309570 | 10/2003 |
| JP | 2003530031 | 10/2003 |
| WO | WO9521414 | 8/1995 |
| WO | WO0025515 A1 | 5/2000 |
| WO | WO0140406 A1 | 6/2001 |
| WO | WO0161488 | 8/2001 |
| WO | WO0176239 A2 | 10/2001 |

OTHER PUBLICATIONS

Chen, et al. "A Scalable Video-On Demand Service for the Provision of VCR-Like Functions" May 15, 1995, Proceedings of the International Conference on Multimedia Computing and Systems, Washington, 15 pages, Institute of Electrical and Electronics Engineers.

Doh, et al., "Fast Forward and Fast Rewind Play System Based on the MPEG System Stream with New Concept", IEEE, May 1999, pp. 846-850.

The European Office Action mailed Apr. 27, 2011 for European Patent Application No. 03014096.6, a counterpart foreign application of U.S. Appl. No. 10/419,622, 14 pages.

The European Office Action mailed Sep. 15, 2011 for European patent application No. 03014095.8, a counterpart foreign application of US patent No. 7,496,283, 7 pages.

Japanese Office Action mailed Nov. 25, 2011 for Japanese patent application No. 2005-144184, a counterpart foreign application of US patent application No. 7,627,227, 1 page.

Tan, et al., "Video Transcoding for Fast Forward/Reverse Video Playback", IEEE ICIP, Sep. 2002, 4 pages.

Wee, et al., "Compressed-Domain Reverse Play of MPEG Video Streams", Part of the SPIE Conference on Multimedia Systems and Applications, Boston, Massachusetts, Nov 1998, SPIE vol. 3528, 12 pages.

Wikipedia, "DirectShow", Feb. 26, 2013, retrived from the internet on May 23, 2013 at URL:http://en.wikipedia.org/wiki/DirectShow.

The European Office Action mailed Jun. 14, 2013 for European patent application No. 03014096.6, a counterpart foreign application of US patent No. 8,169,345, 10 pages.

Yang, "A Tutorial to DirectShow", University of Kentucky, Aug. 1, 2001, retrieved from the internet on May 23, 2013 at URL:www.vis.uky.edu/~ryang/miscellaneous/dshow/dshow_tutorial.ppt.

* cited by examiner

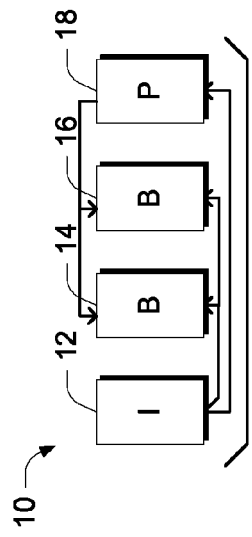
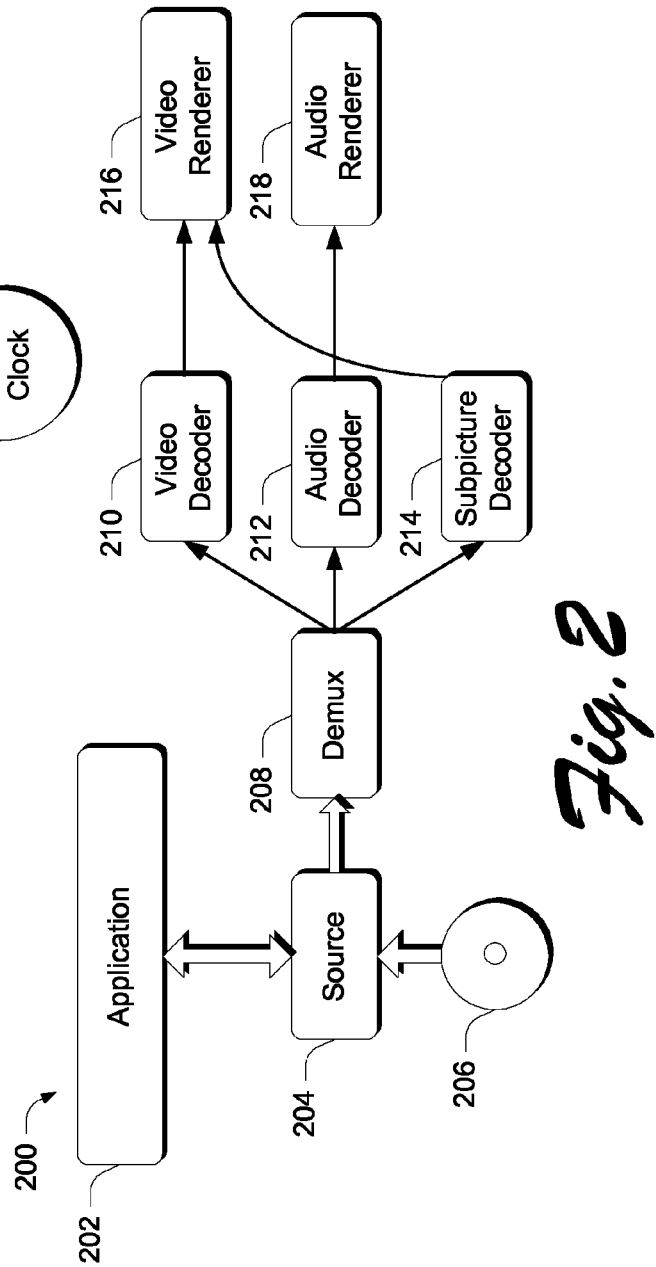

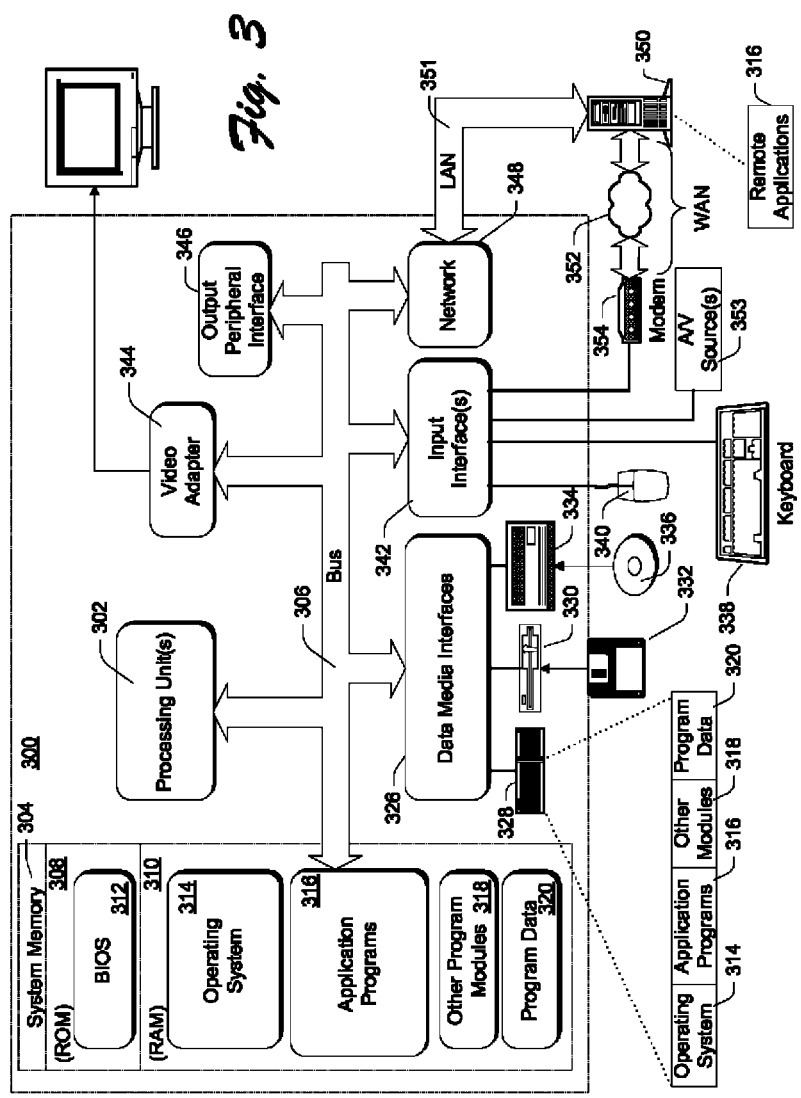

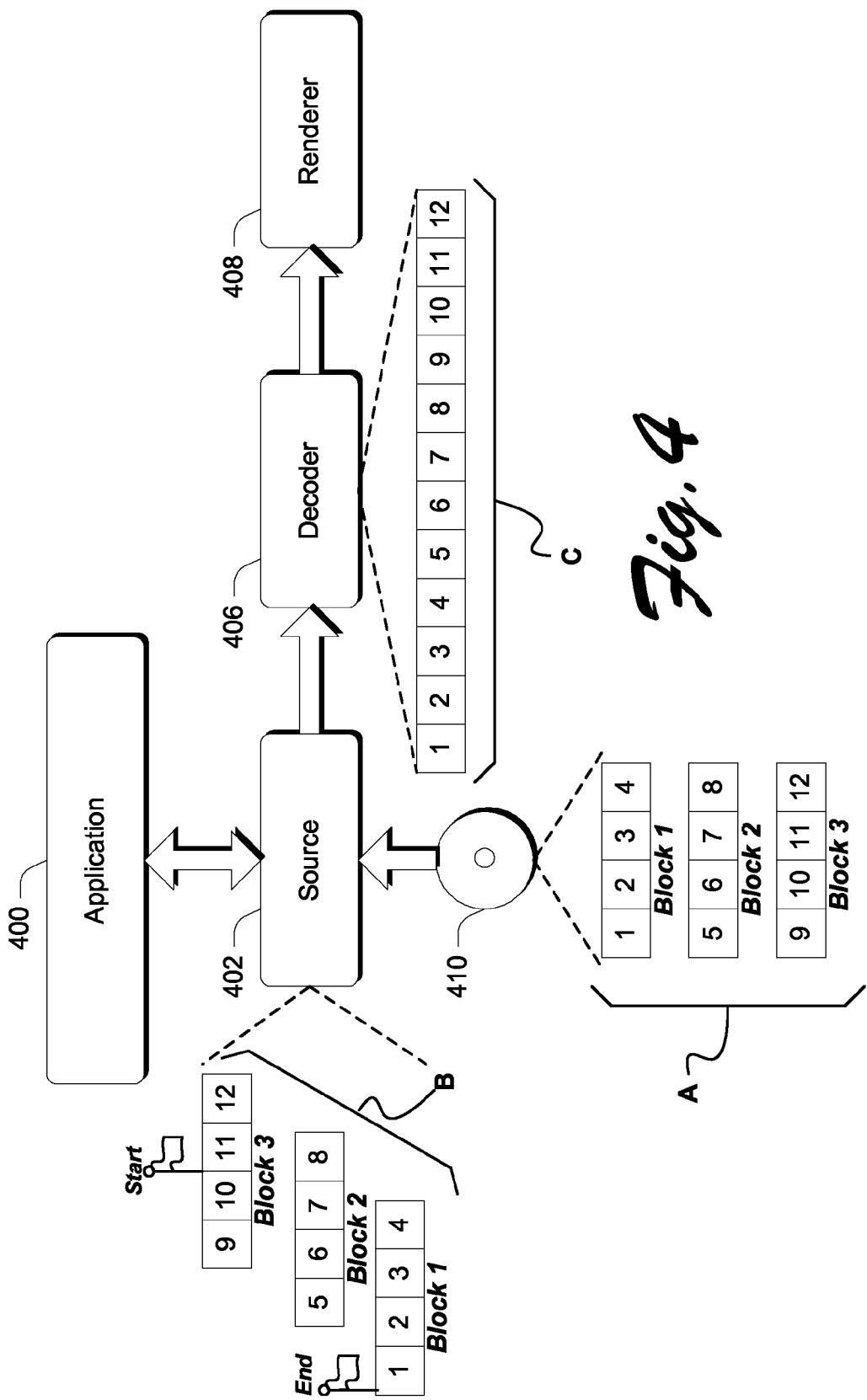

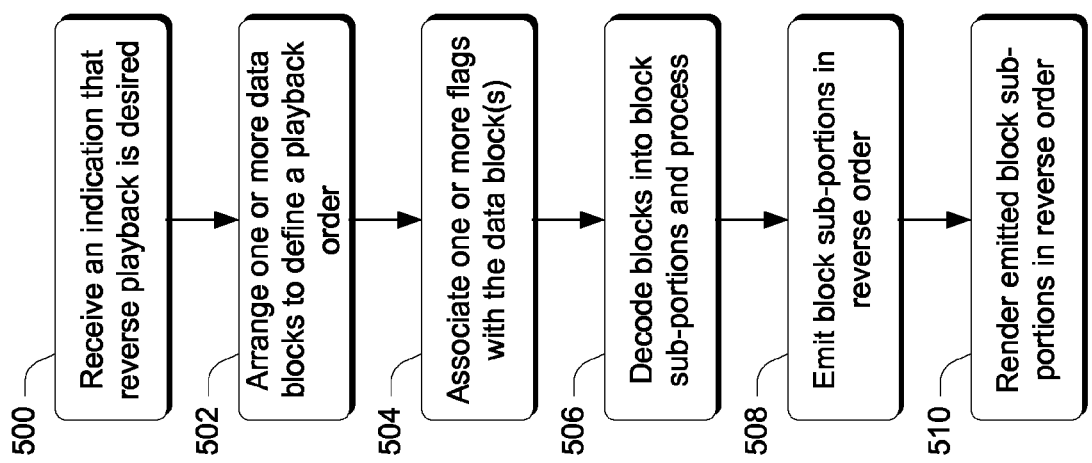

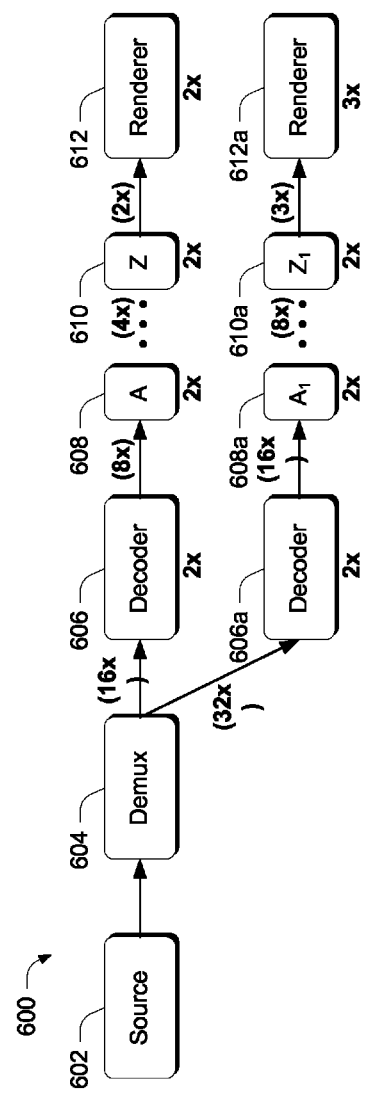

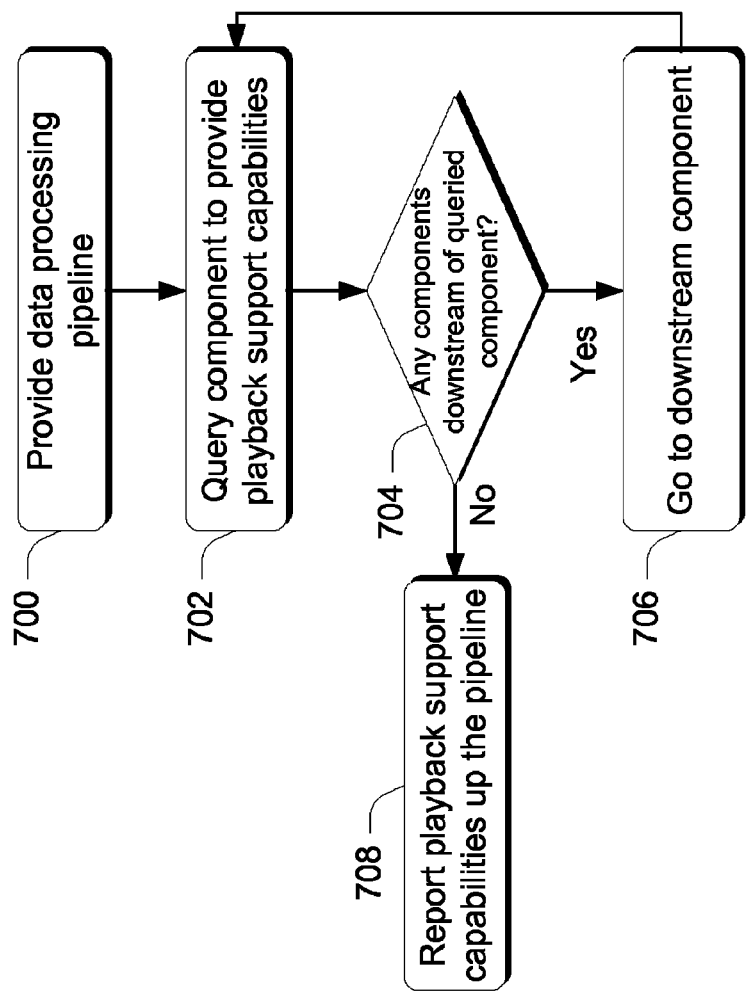

METHODS AND SYSTEMS FOR PROCESSING DIGITAL DATA RATE AND DIRECTIONAL PLAYBACK CHANGES

PRIORITY APPLICATIONS

This application is a continuation of and claims priority from U.S. patent application Ser. No. 10/419,622, filed on Apr. 21, 2003, the disclosure of which is incorporated herein by reference. U.S. patent application Ser. No. 10/419,622 is related to and claims priority to U.S. Pat. No. 7,496,283, filed on Jun. 28, 2002 and issued on Feb. 24, 2009, the disclosure of which is incorporated by reference herein.

TECHNICAL FIELD

This invention relates to methods and systems for processing renderable digital data, such as video data, audio/video data, and the like. In particular, the invention relates to methods and systems for processing playback speed or rate changes and directional changes (i.e. forward and reverse data playback).

BACKGROUND

As the performance of processors, acceleration hardware and storage devices continue to improve, playback speeds beyond normal (i.e., 1.0) are possible. However, buffering and stream alignment issues limit the degree of interactivity between an application and user-perceived changes in the actual playback speed. It is possible to solve this problem in a monolithic and closed environment, where all the components of the solution are intertwined. But it's a much harder issue in the case of an open and componentized solution. Several attempts have been made to solve the problem, although each has fundamental flaws and oversights that have limited their usefulness.

The playback rate (also referred to as the playback speed) determines the amount of time that each frame of data is displayed. Fast playback rates typically display frames for shorter periods of time than slower playback rates. Fast playback rates have high bandwidth requirements that can exceed most processor storage retrieval and hardware capabilities. Usually fast playback rates are approximated using so-called "scan modes" that selectively present only a (small) portion of a data stream by discarding some of the data of the stream. This is somewhat analogous to a rapidly progressing slide show.

Many video applications, such as those that execute on computers or in connection with interactive television sets, are composed of a user interface that controls a source (or source filter). The source (or source filter) is part of a data processing pipeline that processes the data so that the data can be ultimately rendered for a user. The source reads media files and typically passes the data samples or buffers (which are usually compressed using, e.g., MPEG) to some type of decoder for processing. The decoder decompresses the data and passes it to some type of renderer that is configured to and capable of rendering the data for the user. The renderer typically uses an internal (or external) clock, and various timing information that is included with the data samples themselves, to present or render the samples at the correct time. When the renderer begins processing, an initial rendering clock time can be passed to the source and decoder. The source can then begin to produce samples with timestamps that start at some point after the initial renderer time. The timestamps are used by the renderer to schedule and render the various data samples based on their authored time of presentation. Small delays between pipeline and/or processing components (such as filters), can occur since samples are buffered between each stage in the data processing pipeline. The (graph or) pipeline latency is the cumulative propagation delay of the sample from the source (filter) to the time that it is presented or rendered. It has been and continues to be a goal of developers to enable systems to smoothly playback data, such as video content, at different playback rates (both in the forward and reverse directions). The nature of data processing pipelines and various data formats, however, continues to present challenges to developers.

Consider, for example, some different data formats—the MPEG-2, DVD and HDTV formats.

MPEG-2

The MPEG-2 format is a format referred to as a "forward decoding" format. An example representation of an MPEG-2 format is shown in FIG. 1 generally at 10. Each video sequence is composed of a series of Groups of Pictures (or "GOPs"). A GOP is composed of a sequence of pictures or frames. Frames can be encoded in three types: intra-frames (I-frames), forward predicted frames (P-frames), and bi-directional predicted frames (B-frames).

An I-frame or "key frame" (such as I-frame 12) is encoded as a single image, with no reference to any past or future frames. The encoding scheme used is similar to JPEG compression. A P-frame (such as P-frame 18) is encoded relative to the past reference frame. P-frames can also be considered as "delta frames" in that they contain changes over their reference frame. A reference frame is a P- or I-frame. The past reference frame is the closest preceding reference frame. A B-frame (or bi-directional frame, such as frames 14 and 16) is encoded relative to the past reference frame, the future reference frame, or both frames. The future reference frame is the closest following reference frame (I or P). B-frames are a function of only the adjacent reference frames.

The GOP structure is intended to assist random access into a sequence. A GOP is typically an independently decodable unit that can be of any size as long as it begins with an I-frame.

One problem associated with the MPEG-2 format pertains to being able to playback the data in reverse. Playing the data forward is typically not a problem because the format itself is forward decoding—meaning that one must typically decode the I frame first and then move on to the other frames in the GOP. Playing back the data in reverse, however, is a little more challenging because one cannot backward-decode the GOP.

DVD

Normally, when images are recorded on a disk, such as a DVD, the video is actually broken into small units covering a pre-determined time period (typically ½-second units or video object basic units ("VOBUs")). The advantage of this format is that when you play the video, you can progress through the video units one by one. If one wants to jump to an arbitrary piece of video, one can simply jump to the video unit of interest and the audio and video will be synchronized. The location at which all streams are synchronized is referred to as a "clean point". Accordingly, when the video and audio units are compressed, they are compressed in a unit that is to be rendered at the exact same time—that is, there is no skew between the audio and video.

All references to I-frames when discussed within the MPEG2 context can be extended to keyframes in other data formats. The term I-frame is synonymous with a keyframe when discussed outside of the MPEG2 context.

HDTV: ATSC (American Television Standards Commission) and DVB (European Format)

High Definition Television or HDTV uses the MPEG-2 format as well. Here, however, video blocks and audio blocks are aligned with a bit of a skew. In this case, one cannot simply fast forward or jump to a certain point in the stream because, while there may be a video sample at that point, the associated audio sample begins at another location in the stream. Additionally, the audio sample can only be decoded forward as a block. This means that one has to back up within the stream and look for the associated audio sample. Depending on the particular format, one may not really know where the beginning of the corresponding audio block or sample is located. Thus, one has to keep looking back in the stream for some point before both the video and audio samples of interest.

With these different types of formats come challenges when one attempts to enable different playback rates and directions for an open and componentized solution.

Consider now FIG. 2 which illustrates an exemplary system 200 that can render data from a DVD. System 200 includes an application 202 that communicates with a source component 204 that reads data off of a DVD 206. The data that is read off of the DVD includes audio and video data that has been encoded and multiplexed together. As the source reads the data off of the DVD, it applies timestamps to the data packets which are then used to synchronize and schedule the packets for rendering. The packets are then provided to a demultiplexer (or "demux") 208 which splits the packets into different constituent portions—audio, video and, if present, subpicture packets. The packets are then provided by the demultiplexer to an associated decoder such as video decoder 210 (for decoding video packets), audio decoder 212 (for decoding audio packets) and subpicture decoder 214 (for decoding subpicture packets). Each one of the packets has associated timing information, which defines when the packet is supposed to be rendered. The various decoders then decompress their associated packets and send the individual data samples or packets (including the packets' timestamps) to the appropriate renderers—such as video renderer 216 and audio renderer 218.

System 200 also typically includes a global clock 220 that is used by the various renderers to ascertain when to render certain data samples whose timestamps coincide with a time indicated by the global clock.

Assume now that a user indicates, via application 202, that he/she wish to have the data samples rendered at a different, perhaps faster rate.

A past approach for regulating a forward rate change is to manipulate the global clock 220. That is, if one wishes to play data twice as fast as the normal rate, then by manipulating the speed of the global clock, the desired rate change can be implemented. The problem with this approach is that the audio renderer can experience problems associated with frequency shifts and distorted audio output—which degrades the user's experience. Additionally, when the video renderer attempts to comply with the clock change, the video renderer can get behind in its processing which results in the renderer dropping samples to attempt to catch up. The overall result of this is a frequency shift on the audio, and a tug-and-pull on the video. The subpicture component, which can produce data that gets sent to the video renderer, can also have problems associated with the global clock change thus causing, for example, the subpicture to be rendered at an inappropriate time or in connection with inappropriate video. Thus, the quality of the output can be significantly degraded.

Another approach that attempts to deal with a forward rate change is to have source 204 notify demultiplexer 208, which, in turn, notifies video decoder 210 to make the appropriate rate change. The decoder 210 can then do scaling operations on the samples' timestamps to make the video play at a different rate. The problem with this approach is that there is no guarantee that the video decoder 210, audio decoder 212 and subpicture decoder 214 will process the samples using the same techniques and algorithms—which is particularly true if the different decoders come from different vendors. Hence, the rate change can be affected at slightly different speeds which, in turn, can cause the video and audio to start to drift. Even worse, the subpicture can become unsynchronized which can cause it to appear at the wrong time.

Additionally, these two approaches were only really employed in the context of forward-played video and not backward-played video. Using these past approaches, there really was (and is) no way to tell the video renderer to play the video backwards. The video renderer typically has no control over or knowledge about how the video is read off of the disk.

Accordingly, this invention arose out of concerns associated with providing improved methods and systems for processing renderable digital data.

SUMMARY

Various methods and systems permit digital data, such as video data, audio/video data, audio/video/subpicture data and the like, to be processed in a manner that permits playback in both forward and reverse directions. Various embodiments are also directed to handling playback rate changes in a manner that can enhance the user's experience.

BRIEF DESCRIPTION OF THE DRAWINGS

FIG. 1 is diagram of an exemplary block of data that can be processed in accordance with one or more embodiments.

FIG. 2 is a block diagram of a system for processing data blocks.

FIG. 3 is a block diagram of an exemplary computing environment within which principles of the described embodiment can be implemented.

FIG. 4 is a block diagram of a system for processing data blocks in accordance with one embodiment.

FIG. 5 is a flow diagram that describes steps in a method in accordance with one embodiment.

FIG. 6 is a block diagram of a system for processing data blocks and illustrates certain aspects of one or more of the described embodiments.

FIG. 7 is a flow diagram that describes steps in a method in accordance with one embodiment.

DETAILED DESCRIPTION

Overview

Figure 8:
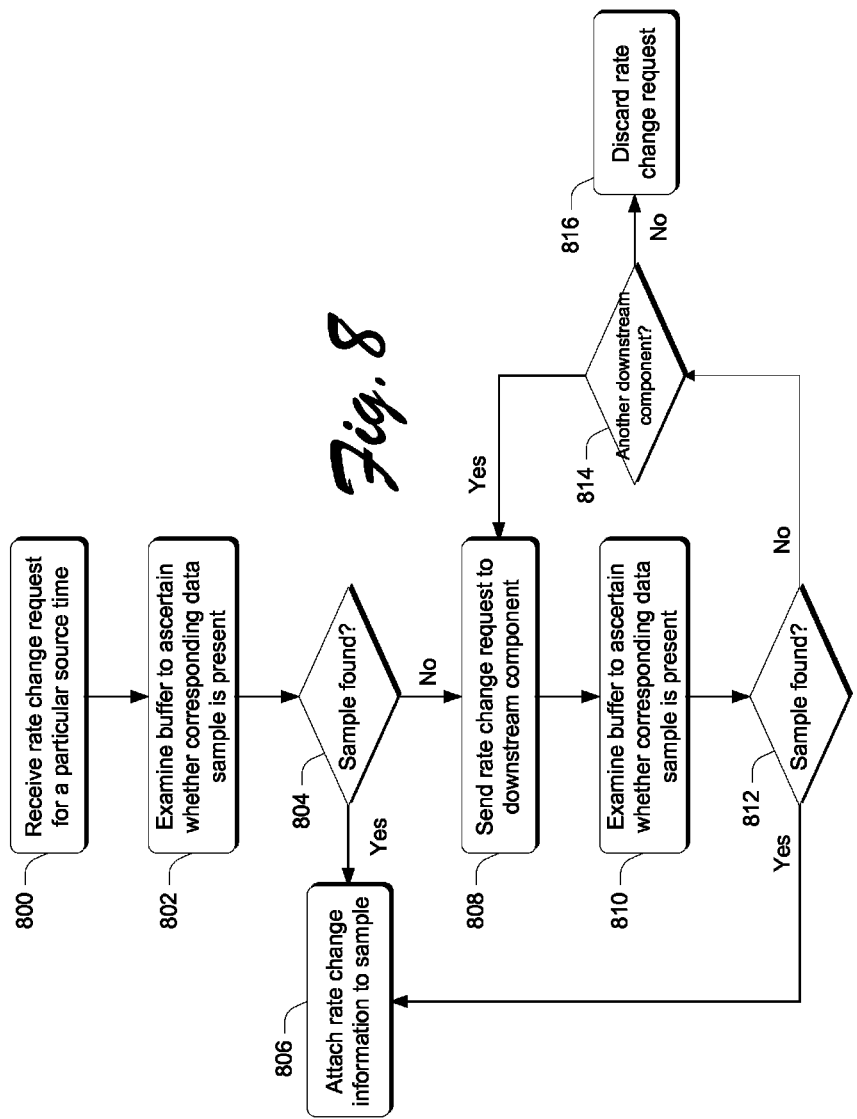
FIG. 8 is a flow diagram that describes steps in a method in accordance with one embodiment.

Various methods and systems described below permits digital data, such as video data, audio/video data, audio/video/subpicture data, to be processed in a manner that permits smooth playback in both forward and reverse directions. Additionally, playback rate changes can be handled in a manner that enhances the user's experience.

Various embodiments described below are directed to addressing several fundamental problems associated with the accurate control of variable speed playback of multimedia content. In accordance with various embodiments, when an application requests a rate change, the rate change is propagated through the pipeline or filter chain using, for example, a sideband messaging mechanism, until the rate change encounters a filter whose queue contains the sample that is the subject of the rate change. The filter then queues up and associates the rate change with the sample of interest, and when the sample is processed by, for example, a renderer, the renderer can then process the sample to implement the rate change.

In addition, solutions are provided (1) for handling media formats that do not include clean points that are conveniently located for implementing rate and directional changes, and (2) for implementing rate changes to have an immediate effect, as perceived by the user.

Exemplary Computing System

FIG. 3 illustrates an example of a suitable computing environment 300 on which the system and related methods described below can be implemented.

It is to be appreciated that computing environment 300 is only one example of a suitable computing environment and is not intended to suggest any limitation as to the scope of use or functionality of the media processing system. Neither should the computing environment 300 be interpreted as having any dependency or requirement relating to any one or combination of components illustrated in the exemplary computing environment 300.

The various described embodiments can be operational with numerous other general purpose or special purpose computing system environments or configurations. Examples of well known computing systems, environments, and/or configurations that may be suitable for use with the media processing system include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

In certain implementations, the system and related methods may well be described in the general context of computer-executable instructions, such as program modules, being executed by a computer. Generally, program modules include routines, programs, objects, components, data structures, etc. that perform particular tasks or implement particular abstract data types. The embodiments can also be practiced in distributed computing environments where tasks are performed by remote processing devices that are linked through a communications network. In a distributed computing environment, program modules may be located in both local and remote computer storage media including memory storage devices.

In accordance with the illustrated example embodiment of FIG. 3, computing system 300 is shown comprising one or more processors or processing units 302, a system memory 304, and a bus 306 that couples various system components including the system memory 304 to the processor 302.

Bus 306 is intended to represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 300 typically includes a variety of computer-readable media. Such media may be any available media that is locally and/or remotely accessible by computer 300, and it includes both volatile and non-volatile media, removable and non-removable media.

By way of example, and not limitation, computer-readable media may comprise computer storage media and/or communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other non-transmission medium that which can be used to store the desired information for access and which can be accessed by a computer. In contrast, communication media may embody computer readable instructions, data structures, program modules, or other data in a modulated data signal, such as a carrier wave, or other transmission mechanism. As defined herein, computer storage media does not include communication media.

In FIG. 3, the system memory 304 includes computer readable media in the form of volatile, such as random access memory (RAM) 310, and/or non-volatile memory, such as read only memory (ROM) 308. A basic input/output system (BIOS) 312, containing the basic routines that help to transfer information between elements within computer 300, such as during start-up, is stored in ROM 308. RAM 310 typically contains data and/or program modules that are immediately accessible to and/or presently be operated on by processing unit(s) 302.

Computer 300 may further include other removable/non-removable, volatile/non-volatile computer storage media. By way of example only, FIG. 3 illustrates a hard disk drive 328 for reading from and writing to a non-removable, non-volatile magnetic media (not shown and typically called a "hard drive"), a magnetic disk drive 330 for reading from and writing to a removable, non-volatile magnetic disk 332 (e.g., a "floppy disk"), and an optical disk drive 334 for reading from or writing to a removable, non-volatile optical disk 336 such as a CD-ROM, DVD-ROM or other optical media. The hard disk drive 328, magnetic disk drive 330, and optical disk drive 334 are each connected to bus 306 by one or more interfaces 326.

The drives and their associated computer-readable media provide nonvolatile storage of computer readable instructions, data structures, program modules, and other data for computer 300. Although the exemplary environment described herein employs a hard disk 328, a removable magnetic disk 332 and a removable optical disk 336, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk 328, magnetic disk 332, optical disk 336, ROM 308, or RAM 310, including, by way of example, and not limitation, an operating system 314, one or more application programs 316 (e.g., multimedia application program 324), other program modules 318, and program data 320. A user may enter commands and information into computer 300 through input devices such as keyboard 338 and pointing device 340 (such as a "mouse"). Other input devices may include an audio/video input device(s) 353, a microphone, joystick, game pad, satellite dish, serial port, scanner, or the like (not shown). These and other input devices are connected to the processing unit(s) 302 through input interface(s) 342 that is coupled to bus 306, but may be connected by other interface and bus structures, such as a parallel port, game port, or a universal serial bus (USB).

A monitor 356 or other type of display device is also connected to bus 306 via an interface, such as a video adapter or video/graphics card 344. In addition to the monitor, personal computers typically include other peripheral output devices (not shown), such as speakers and printers, which may be connected through output peripheral interface 346.

Computer 300 may operate in a networked environment using logical connections to one or more remote computers, such as a remote computer 350. Remote computer 350 may include many or all of the elements and features described herein relative to computer.

As shown in FIG. 3, computing system 300 is communicatively coupled to remote devices (e.g., remote computer 350) through a local area network (LAN) 351 and a general wide area network (WAN) 352. Such networking environments are commonplace in offices, enterprise-wide computer networks, intranets, and the Internet.

When used in a LAN networking environment, the computer 300 is connected to LAN 351 through a suitable network interface or adapter 348. When used in a WAN networking environment, the computer 300 typically includes a modem 354 or other means for establishing communications over the WAN 352. The modem 354, which may be internal or external, may be connected to the system bus 306 via the user input interface 342, or other appropriate mechanism.

In a networked environment, program modules depicted relative to the personal computer 300, or portions thereof, may be stored in a remote memory storage device. By way of example, and not limitation, FIG. 3 illustrates remote application programs 316 as residing on a memory device of remote computer 350. It will be appreciated that the network connections shown and described are exemplary and other means of establishing a communications link between the computers may be used.

First Exemplary Embodiment—Reverse Playback/Rate Changes

FIG. 4 diagrammatically illustrates a first embodiment in which digital data that is embodied on some type of media is processed so that it can be rendered in reverse. In this example, a system includes an application 400 that provides an interface through which a user can interact with the particular digital media that is to be processed and rendered. The system also includes one or more sources 402 for reading the data that is to be rendered, one or more decoders 406 for decoding or decompressing data that is to be rendered, and one or more renderers 408 for rendering the data (although only one of each type of component is shown). Digital media which is to be rendered by renderer 408 is provided on a media 410 which, in this example, comprises a disk such as a DVD. However, any type of medium can be utilized to store the digital media. It should be appreciated that while the source, decoder and renderer are shown as separate individual components, it is possible for the functionality of each to be provided in a more integrated fashion.

Media 410 typically holds a large amount of data that can be rendered. The data is usually organized into logical units. Here, the logical units are represented as blocks. The term "blocks" is not intended to designate any specific type of data or medium. Rather, the term is used to illustrate the principles under which this embodiment operates. Accordingly, the illustrated blocks can represent different types or formats of data which usually break up the data into sections beginning with keyframes. For example, the blocks can comprise GOPs such as would be utilized to format data in the MPEG-1 or MPEG-2 format. The blocks can also represent VOBUs such as would be used to format data on a DVD.

One characteristic of such blocks is that the individual blocks are comprised of sub-portions that represent sub-components of the blocks. So, in the case where the block represents a GOP, individual sub-portions can include an I-frame and one or more P-frames or B-frames. The sub-portions of each block are indicated numerically inside each block. For example, Block 1 is comprised of sub-portions 1, 2, 3, and 4, each of which indicating a video frame.

Blocks can also be decomposed into smaller independent subblocks which are passed to downstream components to be processed as blocks. For example, in DVD a VOBU could contain several GOPs. The VOBU block can be broken into several subblocks, each containing a GOP. This is useful when playing content in reverse, since the larger blocks can be decomposed into smaller blocks whose order is reversed when they are sent downstream. New timestamps need to be computed for each of the new subblocks (see FIG. 14).

When a user indicates, via application 400, that they wish to play particular data (such as video data) in reverse, application 400 notifies source 402 that reverse playback is intended. The application can also typically indicate a time range or source time over which the reverse playback is to occur. When the source 402 enters a time period over which the reverse playback is to occur, the source reads blocks of data within the relative source time in reverse.

Consider, for example, FIG. 4. Notice that media 410 is shown to include three individual blocks (designated as Block 1, Block 2 and Block 3) as group A. Actually, media 410 includes many more blocks than those illustrated. Assume though, in this instance, that the user has indicated to source 402 via application 400 that they desire to play the blocks of group A in reverse.

As the source reads data from media 410 it keeps track of the source time and when the source time coincides with Blocks 1-3, Blocks 1-3 are read in reverse order. Specifically, Block 3 is read first, then Block 2, and then Block 1. Hence, notice to the left of source 402 that the ordering of the blocks, as read, is Block 3/Block 2/Block 1 to define a group B. Source 402 then adds one or more flags to the blocks to indicate that they are intended for reverse playback. Specifically, notice that a start flag is added to Block 3 and an end flag is added to Block 1. Any suitable arrangement of flags can be used to designate the blocks for reverse playback. For example, the flags can be added to each block. Source 402 can also process the blocks by adding timestamps to the blocks. This can be done by mapping each block's source time to monotonically increasing timestamps that are used by the renderer to schedule rendering activities.

Each block is then provided by source 402 to decoder 406. It will be appreciated that a demultiplexer or splitter can be interposed between the source and decoder—but for simplicity sake is not illustrated here. So, in this example, Block 3 can be provided to decoder 406, then Block 2 and finally Block 1. Alternately, the source can pre-parse blocks and send smaller subblocks of a block at a time in reverse order to the decoder for processing or decoding/decompressing. This reduces the size of the blocks propagating to the decoder.

When the decoder 406 receives the blocks, it has to decode from left to right. But the flags on the block indicate to the decoder that it is to decode the blocks and reverse the order of the sub-portions (frames) of the blocks that it emits to renderer 408. Specifically, when decoder 406 receives Block 3, it decodes the block as usual and can buffer the decoded block portions while it processes the other blocks. The decoder 406 similarly processes Blocks 2 and 1. When the decoder reaches the end flag, it knows that the particular block sequence for which reverse play is to occur has been defined. The decoder can now reverse the timestamps on the block sub-portions and can emit the block sub-portions to renderer 408 in reverse order. The emitted block sub-portions are designated as group C.

As can be seen, the renderer receives a stream of data that is reversed relative to the order that the stream would have if it was forward-played. The renderer can now schedule the stream for rendering. The renderer here is unaware of the stream being played in reverse direction, as that detail is confined within the source and decoder components.

Now assume that the user wishes to implement a rate change to change the playback rate. In this embodiment, rate changes can be implemented as follows. Assume that a user wishes to have data rendered at a rate that is faster or slower than normal, i.e., 1×. Rate changes can be communicated to source 402 via application 400. The rate change information can be provided from the source to decoder 406 so that rate change processing can be performed by the decoder. In this embodiment, the decoder can perform rate change processing by manipulating the timestamps of the samples or block sub-portions that it processes. For example, if a group of samples is to be rendered at 1× and has timestamps that extend from $t_1$ to $t_4$, such samples can be rendered at 2× by changing the timestamps from $t_1$-$t_4$ to $t_1$-$t_2$, where $t_2$-$t_1$=$(t_4$-$t_1)/2$.

FIG. 5 is a flow diagram that describes steps in a method in accordance with one embodiment. The method can be implemented in any suitable hardware, software, firmware or combination thereof. In the illustrated example, the method can be implemented in connection with the system shown and described in connection with FIG. 4.

Step 500 receives an indication that reverse playback is desired. This step can be implemented by receiving a communication or call from a software application that reverse playback is desired. This communication can include a range of source times over which reverse playback is desired. Step 502 arranges one or more data blocks to define a playback order. This step can be implemented by reading blocks that correspond to an indicated source time range in reverse. One example of how this can be done is given above. Step 504 associates one or more flags with the data block(s). The flag or flags are intended to indicate that one or more of the blocks of interest are subject to reverse playback. Here, a reverse playback start flag and a reverse playback end flag can be associated with the block(s) of interest.

Step 506 decodes blocks into individual block sub-portions and can further process the block sub-portions pursuant to the desired reverse playback. This can include, for example, buffering the block sub-portions for a predetermined period of time. For example, the block sub-portions can be buffered until all of the block sub-portions intended for reverse playback have been decoded. Alternately or additionally, the block sub-portions can be buffered until a pre-determined number or amount of sub-portions have been buffered. The buffered decoded data can also be used with compressed source data to completely regenerate the reverse playback stream. Additionally, the block sub-portions can also be processed so as to manipulate their associated timestamps. This can include reversing the effective order of the timestamps for the individual sub-portions. This can also include any timestamp processing due to any rate changes that might be requested. Such timestamp processing can include changing the values of the timestamps.

Step 508 emits the block sub-portions in reverse order. In this step, the flag(s) of step 504 can be utilized to indicate that the block sub-portions should be emitted in reverse order. Thus, when for example, decoder 406 (FIG. 4) processes the block sub-portions, the presence of any flags can indicate that the decoder should emit the block sub-portions in reverse order. The decoder can then emit the block sub-portions in reverse order. One example of how this is done is given above. Step 510 then renders the emitted block sub-portions in the reverse order that the sub-portions were emitted.

The same algorithm can be applied to break up a block into subblocks, which may be used by higher level components such as the source or decoder. Effectively, the source is breaking up the entire video into subblocks (VOBUs in the DVD case) and emitting them in reverse order with reversed timestamps. The decoder can break the VOBUs into GOP blocks to pass to the renderer by reading and caching a VOBU, then emitting the cached data in reverse order.

The above-described processes and systems have a higher requirement of memory to buffer the decoded block sub-portions. But the advantages of this approach include the following. First, some systems attempt to achieve reverse playback by repeating a process that effectively jumps backward in position and plays forward for a number of frames, and then again jumps backward in position and plays forward for a number of frames. This process can become extremely computationally inefficient since it repeats work and will usually degrade the user's experience. Other approaches can only work on one data block at a time.

The above systems and methods can actually change the order of multiple blocks when reverse playback is desired. Further, use of flags permits the system to actually render individual block sub-portions or frames in reverse order. Also rate changes can be smoothly provided by manipulating the timestamps of the block sub-portions. Other advantages will be apparent to those of skill in the art.

As a performance advantage, the methods and systems described above can take advantage of various pipelined video acceleration techniques in the graphics processor. This is particularly true for the decoder. This can permit the data pipeline to effectively run continuously and can avoid initialization startup costs. Various pipelined video acceleration techniques are described in U.S. patent application Ser. No. 09/839,682, entitled "An Extensible Multimedia Application Program Interface And Related Methods", filed on Apr. 20, 2001, the disclosure of which is incorporated by reference herein.

Second Exemplary Embodiment—Reverse Playback/Rate Changes

In the embodiment described above, the decoder was configured to process any rate changes as well as any reverse playback requests from the application. Systems for processing renderable data can, however, include more components in the chain or processing pipeline. For example, one type of processing pipeline is known as a filter graph. Filter graph is a directed network of filters (or processing units). It can contain many different types of filters that are configured to process data to be finally rendered. In addition to source and decoder filters, such filter graphs can contain transform filters, effects filters, network links, analysis filters and the like.

It can be advantageous to distribute playback and rate change processing across the system, pipeline or filter graph. One reason for this is increased flexibility of implementation as well as an open and extensible architecture. For example, if the user requests a rate change for a sample that has already been processed by the decoder, but which is queued up at a downstream component that is unable to effectuate the rate change, most if not all current systems will typically ignore the rate change.

Typically, rate changes can take place in one of two ways. First, the user can request that a rate change take place presently or "now", which semantically means at the next available time. Perhaps the user manipulates a slider in a UI that affects the playback rate. Second, a rate change can be scheduled at a given location in the source content. For example, perhaps the user indicates that a rate change to 2× is desirable starting at a source time of 00:00:05. These two scenarios are fundamentally different. The first scenario is the more difficult scenario because of the timing of the request and the state of the processing pipeline at that moment. It's possible that the source content has already been read by the source and forwarded to the next component in the pipeline. The second scenario is a less difficult problem, because one knows where the rate changes are going to occur and hence, the rate changes can be scheduled in advance.

As noted above, when the source processes data, it reads the data from a particular medium and maps source times associated with the data to timestamps that are used to schedule rendering. For example, the table immediately below illustrates a representation of the mapping operation that is performed by the source for a forward play at 1×.

| Source Time | Timestamp |
|---|---|
| 00:00:01 | Frame 1 (0 sec.) |
| 00:00:02 | Frame 2 (1 sec.) |
| 00:00:03 | Frame 3 (2 sec.) |
| 00:00:04 | Frame 4 (3 sec.) |
| 00:00:05 | Frame 5 (4 sec.) |

In the table above, source times that correspond to 00:00:01 through 00:00:05 are mapped to timestamps that coincide with particular frames that are to be rendered. For example, 00:00:01 maps to a timestamp that corresponds to Frame 1; 00:00:02 maps to a timestamp that corresponds to Frame 2 and so on. Thus, there is a one-to-one mapping relationship for forward playback at 1×.

When there is a request for a reverse playback, the mapping operation is changed somewhat. In this instance, the source still maps source times to timestamps. However, the source does so in a manner that not only provides a continuous, monotonically increasing stream of timestamps, but takes into account the reverse playback request as well. For example, the table below illustrates a mapping operation for a reverse playback at 1× over the source time range of 00:00:01 through 00:00:05:

| Source Time | Timestamp |
|---|---|
| 00:00:01 | Frame 5 (0 sec.) |
| 00:00:02 | Frame 4 (1 sec.) |
| 00:00:03 | Frame 3 (2 sec.) |
| 00:00:04 | Frame 2 (3 sec.) |
| 00:00:05 | Frame 1 (4 sec.) |

Notice here that the source times are reassigned to reflect reverse playback, but the corresponding timestamps continue to monotonically increase. Thus, when the renderer receives the data samples, it will schedule rendering so as to affect reverse playback.

Now assume that there is a jump to another portion of the source content. Perhaps the source content is to be rendered for a source time range of 00:00:01 through 00:00:05, and then there is to be a jump to a source time range of 00:00:20 through 00:00:24. In this case, the mapping operation would produce a stream of monotonically increasing timestamps as follows:

| Source Time | Timestamp |
|---|---|
| 00:00:01 | Frame 1 (0 sec.) |
| 00:00:02 | Frame 2 (1 sec.) |
| 00:00:03 | Frame 3 (2 sec.) |
| 00:00:04 | Frame 4 (3 sec.) |
| 00:00:05 | Frame 5 (4 sec.) |
| 00:00:20 | Frame 6 (5 sec.) |
| 00:00:21 | Frame 7 (6 sec.) |
| 00:00:22 | Frame 8 (7 sec.) |
| 00:00:23 | Frame 9 (8 sec.) |
| 00:00:24 | Frame 10 (9 sec.) |

Thus, in this embodiment, the source's responsibility is to receive requests from the application and map the context based location of the source data (i.e. the source times) into monotonically increasing output timestamps. In doing so, a continuous stream of data can be provided to the renderer for rendering. This is advantageous from the standpoint of other components, particularly the decoder, in that the other component do not need to keep track of timestamps and where they are in a particular process. Rather, the other components can simply receive and process samples having a linear stream of timestamps.

To facilitate processing at the source, the source can maintain a history of when it performed rate changes and where the rate changes map into a list of events that are to occur in the future. Then, if the application starts asking for rate changes at a particular time, the source is aware of how it has organized the rate changes in the past. It is also aware of whether the source content associated with any rate changes has already been passed to a downstream component for processing. If so, the source can take steps to attempt to have the rate change implemented by, for example, passing the rate change request to downstream components and having those components perform associated processing for implementing the rate change. In other approaches, any such rate change requests for source content that had already left the source were simply dropped.

Querying the Pipeline to Ascertain Component Capabilities

One advantageous feature of some of the embodiments described above and below is that the source has the ability to query components within the processing pipeline to ascertain the capabilities of the components. For example, the source can query the components such as the decoder to ascertain whether they support reverse playback, which playback rates they support, their maximum and minimum playback rates and the like. By doing so, the source can then make intelligent decisions concerning how it reads the source data and, in some instances, the format of the source data that it sends along to the other components.

As an example, consider the following. To implement rate changes and to do so intelligently, it can be advantageous for the source to know the maximum rate that is supported by the entire pipeline or filter graph. This can be the case for both forward and reverse playback. In this embodiment, one or more of the pipeline components are provided with an interface (which is simply a collection of callable methods) that can be queried by the source. When the pipeline is constructed or instantiated, the source can query one or more of the interfaces to ascertain the capabilities of the components. For example, the source might query the components to ascertain if any of them support reverse playback. If not, this can cause the source to enter a simpler mode in which it does not support reverse playback and indicate that to the application which will make the application present a smarter UI to the user. This can include, for example, to just reading the key frames of the blocks in the reverse order, rather than reverse reading the whole block and tagging them with appropriate flags, which the decoder cannot act upon anyway. Additionally, the source can query to ascertain the playback rates that are supported. By knowing this, the source can adapt its processing to ensure that it does not overwhelm the pipeline. For example, if a particular playback speed is not supported by the pipeline, then the source may only send certain block portions (e.g. I frames only) for further processing by the pipeline. This helps to ensure that the pipeline is not unduly burdened with data that it cannot efficiently process, while at the same time attempts to provide a rendered display that is as close to the requested playback rate as possible.

One way of implementing the querying process is as follows. When the source first starts out or is instantiated, it queries, either directly or indirectly, every component down the pipeline for their capabilities, e.g. their maximum forward and reverse rates. One way of doing this is for the source to query the first downstream component, and for the first downstream component to query its first downstream component and so on. As an example, consider FIG. 6 which shows an exemplary pipeline 600 that includes a source 602, demux 604, decoders 606, 606*a*, components 608, 608*a*, 610, 610*a* (which can be any suitable components), and renderers 612, 612*a*. In this case, source 602 queries demux 604; demux 604 queries decoders 606, 606*a*, and so on. The query results can then be bubbled back up the pipeline.

Assume in this example that the source is interested in the maximum forward playback rates of the various components. In this example, each of the component's maximum rates is shown immediately beneath the component. So, for example, the maximum rate of renderer 612 is 2×; and the maximum rate of renderer 612*a* is 3× and so on. There are a couple of ways that the source can make a decision on the maximum rate of the pipeline in general. First, the source can, in a conservative approach, simply take the minimum of all of the rates of the various components. So, in this particular example, the minimum of all of the rates is 2×. Hence, with this knowledge, the source can assume that any requested rates below 2× can be rendered smoothly without having to drop meaningful amounts of data. A second, more aggressive approach, is to assume that there is a multiplicative effect as between the various components. For example, if a first component can support 2× and its downstream component can support 3×, then the maximum rate change that can be provided together by the components is 6×. Thus, in the figure, when the renderer 612 is queried by component 610, it reports a playback rate of 2× (which is indicated in parentheses between the components). Accordingly, component 610 can report, because of the multiplicative effect, a playback rate of 4× to component 608. Likewise, component 608 can report a playback rate of 8× to component 606 and so on. Assume in this example that demux 604 supports only a 1× playback rate. The demux 604 can now report to source 602 two playback rates—16× and 32×. In accordance with this approach, the source can now select the lower of the two playback rate, i.e. 16× as the maximum playrate supported by the pipeline to achieve a generally smooth playback rate.

Once the source knows the rate capabilities of the pipeline (e.g. 16×), it knows that it can provide entire data blocks to the pipeline when the requested rate equal to or less than 16× and the data will be rendered at this rate. It also knows that for any requested rate changes greater than 16×, it may have to do some additional processing to attempt to provide the higher rate. This can involve sending only truncated and/or selective blocks for processing by the pipeline. This mode is referred to as a "scan mode" where, for example, only keyframes might be sent by the source to the pipeline for processing.

FIG. 7 is a flow diagram that describes steps in a method in accordance with one embodiment. The method can be implemented in any suitable hardware, software, firmware or combination thereof. In the illustrated example, the method can be implemented in connection with a system such as the one shown and described in connection with FIG. 6.

Step 700 provides a data processing pipeline. Any suitable data processing pipeline can be provided. Suitable pipelines typically include one or more components that read source data off of some type of medium (such as a disk), demultiplex the data into individual data streams, decode the data and process it in some manner, and render the data for a user to enjoy. These different functionalities tend to be performed by different components—although such need not be the case.

Step 702 queries a component for providing playback support capabilities. Examples of playback support capabilities include, without limitation, playback rates (maximum, minimum and/or a range of rates), playback directions (forward, reverse), and the like. Step 704 determines whether there are any components downstream of a queried component. If there are, step 706 goes to the next component and returns to step 702 to query the component to provide its playback support capabilities. If there are no additional downstream components, then step 708 reports the playback support capabilities up the data processing pipeline.

This step can be implemented in a couple of different ways. First, as noted above, the capabilities of each component can be reported to the source, which can then make intelligent data processing decisions. For example, the playback rates of each of the components can be reported to the source so that it can select the minimum playback rate. Second, the capabilities of each of the components can be considered in connection with the capabilities of all of the other components.

For example, the playback rates of all of the components in a particular pipeline or sub-pipeline can be multiplied so that an overall effective playback rate that is supported by the pipeline or sub-pipeline can be ascertained. Once ascertained, the source can make intelligent decisions on how to process data, as noted above.

In the example embodiments described above, every suitably configured component (filter) can be thought of as a data manipulator. That is, individual components can partially process the data and pass along appropriate hints as to how the data has been manipulated. The next component can further process the data towards achieving a desired playback rate or direction.

If necessary, for example, the source can reduce the amount of data that it provides to the decoder while at the same time maintain any timing information (such as a rate change) with the data. This gives the decoder a hint that a rate change is desired. The decoder can receive the data from the source and, in addition to decoding, can process it in a manner that attempts to achieve the rate change. Components in a chain can have the option of processing the data in a manner that is directed to achieving the desired playback, or, the component can pass the data down to the next component along with information on any rate changes. Such processing can include reversing data block portions, reassigning timestamps in an event that a reverse playback request has been received, and removing any associated flags from the data.

Thus, in this example, the source is responsible for flipping the stream around at the block level and adding flags to indicate that reverse playback is intended. The blocks are then propagated downstream to other components. When a component encounters data having a reverse flag, the component has the option of passing the blocks to another component downstream, or processing the data to, for example, flip the order of the frames, remove the flags, and push the data to the next component. Ultimately then, the renderers receive what looks like a forward stream having appropriately increasing timestamps.

Rate Changes for Blocks That Have Left the Source

The above-described embodiments work well when a rate change is to occur at a given time, and the source has not yet read the data blocks over which the rate change is to be implemented. There is another situation, briefly mentioned above, where a rate change request is received after the source has read the data blocks and/or passed the blocks along to a downstream component for processing.

In the embodiment about to be described, flexibility is enhanced by distributing processing across the component pipeline or filter graph. Specifically, the application can request the source component to perform a rate change at a specific time or source time. The rate change information is then propagated through the pipeline until it encounters a component, whose queue contains a data sample with the source time associated with the rate change. The component can then queue up the rate change request so that the rate change is processed with the sample. When the corresponding sample is processed by the component, the component can perform any necessary processing such as altering the output data (e.g. the sample's timestamp). If further processing is necessary, the component can pass along the rate change information (as well as any other useful information) with each output sample. Eventually the renderer will receive the sample and can schedule rendering. It is to be appreciated that the renderer can also be configured to implement playback or rate change processing as part of the distributed process.

Another significant advantage is that the source's rate change queue is limited to data it has not sent or read yet. The remainder of the queue is distributed across the pipeline, which in most cases will be relatively short.

As an example, consider the following. When an application sends a rate change request to the source, the source can look in its buffers and ascertain whether the data relative to which the rate change is to take place is located in its buffers. The source can typically do this by noting the source times over which the rate change is to take place. If the data in the source's buffer have corresponding source times that are greater than the source times over which the rate change is to take place, then the data samples have already been passed to a downstream component. If the source locates a buffer that contains a data sample subject to the rate change, the source can associate rate change information with the sample.

That is, in accordance with this embodiment, every data sample contains a list that includes properties that define (1) any rate changes, (2) the time range when the sample should be played, (3) whether the sample is to be played in forward or reverse. These lists are propagated along with the data sample so that components in the pipeline do not have to maintain a list of every rate change that has occurred in the past.

If the source checks its buffers and does not find the samples on which the rate change is to occur, the source sends the rate change request to the next downstream component. The next component then performs a similar process by checking its buffers to ascertain whether the buffers contain the sample on which the rate change is to occur. If the component finds the appropriate data sample, it can either add the rate change information to the sample when it processes the sample, or it can look into its buffers and attach the rate change information to the sample in its buffer. This process can be performed by any suitably configured components in the data pipeline.

FIG. 8 is a flow diagram that describes steps in a method in accordance with one embodiment. The method can be implemented in any suitable hardware, software, firmware or combination thereof. In the illustrated example, the method can be implemented in connection with a system such as the one shown and described in connection with FIG. 6.

Step 800 receives a rate change request for a particular source time. Typically, the rate change request originates with an application and is passed to the source. Responsive to receiving the rate change request, step 802 examines one or more buffers to ascertain whether a corresponding data sample over which the rate change is to occur is present. The buffers that are examined are the buffers that are associated with the component that received the rate change request. If the sample is found (step 804) then step 806 attaches rate change information to the sample. This step can be implemented in a couple of ways. For example, the rate change information can be attached to the sample while it is in the buffer. This can be implemented when the buffer is a read/write queue. Alternately, the rate change information can be cached and attached to the sample when it is processed by the component. This step can be implemented when the buffer is a read only queue.

If, on the other hand, the sample is not found in the component's buffers, step 808 sends the rate change request to the next in line downstream component. Step 810 then examines the buffers associated with the downstream component. This step can be implemented by the component that received the rate change request. If the sample is found (step 812), the method can branch to step 806. If, on the other hand, the sample is not found, step 814 determines whether there is another downstream component. If so, the method branches to step 808 and sends the rate change request to the next component. If, on the other hand, there are no additional downstream components, step 816 discards the rate change request. Presumably, this step is implemented by the renderer. Discarding the rate change request will only have a temporary effect on the output rate of the rendering.

Scheduling Rate Changes to Have A Perceived Immediate Effect

Various embodiments discussed above provide various ways to implement rate changes for digital data. Now consider the situation where it is desired to implement a rate change that is perceived by the user as instantaneous or immediate. That is, consider that the user is playing a multimedia presentation on an application and selects, via a suitable user interface, a button that tells the application to implement a rate change "now". Perhaps the user wishes to play the presentation at twice the normal rate.

One way of implementing such a rate change would be to start the rate change command with a data sample at the source, and pass the rate change command down the filter graph components, with the accompanying data sample, until the command and the sample reach the renderer. When the renderer receives the command, it can begin to implement the rate change. This approach is problematic because there may be delays experienced in the filter pipeline which cause the data samples, and hence, the rate change command, to propagate slower than is desirable—thus delaying the instantaneous effect of the rate change. Additionally, because filter graphs typically process both video and audio samples, synchronization problems can arise if this approach is used.

In accordance with one embodiment, the source and the various components in the filter graph are configured such that they can communicate in a sideband fashion. Using sideband communication, the source can effectively determine when to schedule an immediate rate change, and can communicate rate change information to the various components in the filter graph. As communicated, the rate change can be perceived by the user to be instantaneous or immediate.

Figure 9:
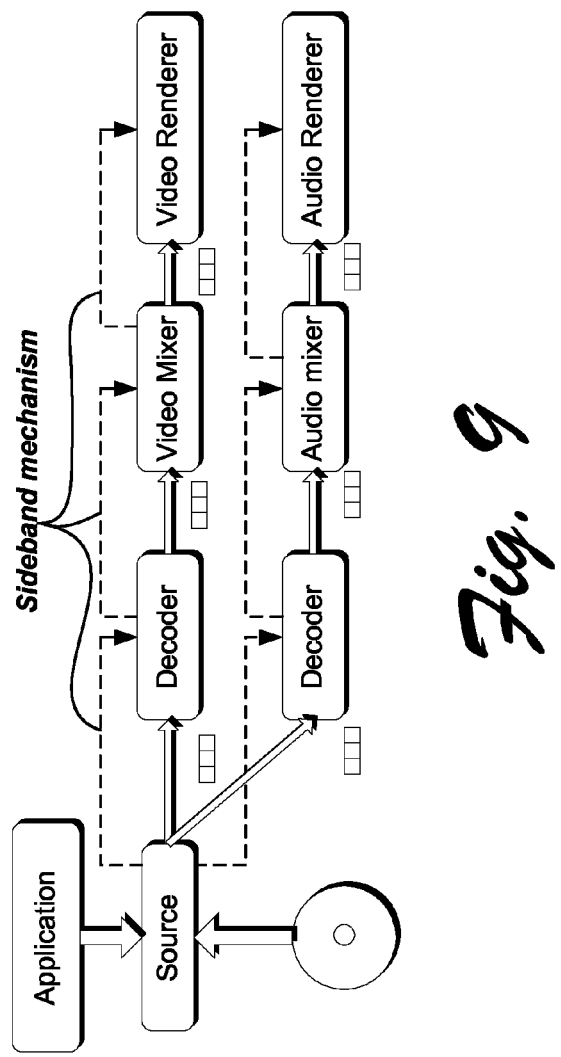
FIG. 9 is a block diagram that illustrates filter graphs in accordance with one embodiment.

As an example, consider FIG. 9 which shows filter graphs that are configured to process both video and audio samples. Specifically, a video filter graph processes video samples and utilizes a video decoder, a video mixer, and a video renderer. An audio filter graph processes audio samples and utilizes an audio decoder, an audio mixer, and an audio renderer. Each of the components in the filter graphs have their associated buffers depicted to the left of, and slightly below each of them.

A sideband mechanism, indicated by the dashed lines, is provided between the source and the individual components of each of the filter graphs. The sideband mechanism effectively provides a virtual command channel that can be used to schedule rate changes that appear, to the user, to have an immediate effect. In one embodiment, the sideband mechanism is implemented by one or more interfaces that comprise callable methods. An implementation example is provided below and gives one example of callable interfaces.

In accordance with one embodiment, scheduling a rate change so that it is perceived by the user to have an immediate effect can be broken down into two different problems. First, one determines the soonest time that a rate change can be implemented. Second, after ascertaining the soonest time, one uses this information to schedule the rate change. The sideband mechanism or virtual command channel provides a desirable solution to each of these problems.

Figure 10:
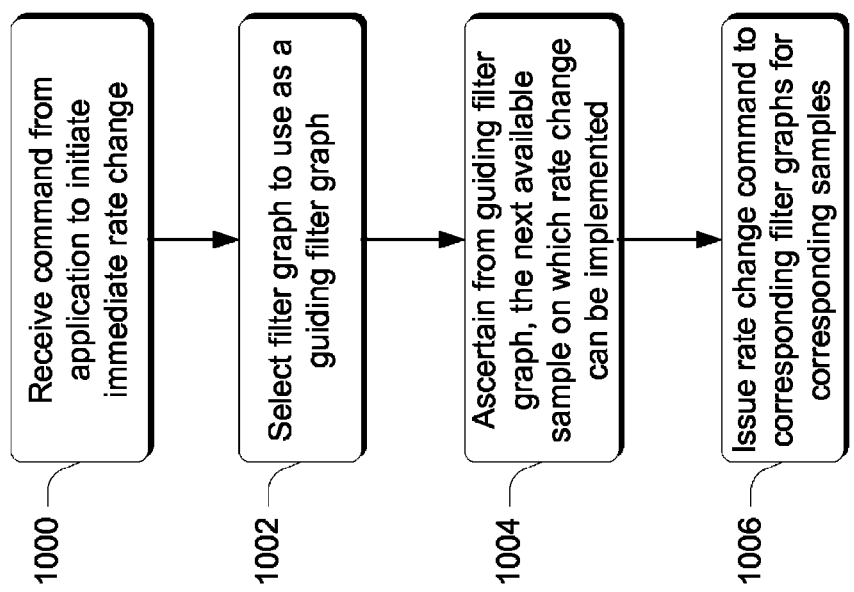
FIG. 10 is a flow diagram that describes steps in a method in accordance with one embodiment.

As an example method for implementing a perceived immediate rate change, consider the FIG. 10 flow diagram. This method can be implemented in connection with any suitable hardware, software, firmware or combination thereof. In the illustrated example, the method is implemented utilizing software that provides a suitable sideband mechanism in the form of a virtual command channel, such as the one shown and described in connection with FIG. 9.

Step 1000 receives a command from an application that indicates an immediate rate change is to be initiated. This step can be implemented by the source receiving a communication from the application. Step 1002 selects a filter graph to use as a guiding filter graph. Here, the guiding filter graph is selected to be the filter graph that represents the least flexible filter graph in terms of its ability to recover from a loss of data. In one embodiment, the guiding filter graph is selected as the audio filter graph due to the fact the audio buffers are typically the largest and least flexible. In the FIG. 9 example, the bottommost filter graph would be selected.

Once the guiding filter graph is selected, step 1004 ascertains, from the guiding filter graph, the next available sample on which the rate change can be implemented. In one embodiment, this step can be accomplished by the source calling a method that requests a rate change at the next available sample. This call can be propagated along the individual components to the last component that is capable of scheduling a rate change. In one embodiment, the last component that is capable of scheduling a rate change is the renderer.

Responsive to receiving the request, the component (e.g. the renderer) examines its queue to ascertain which of the data samples in its queue is the next available sample on which a rate change can be scheduled. For example, if the audio renderer has three data samples in its queue and is currently sending the first in-line sample to the audio hardware for playing, then the rate change cannot be scheduled for this first-in-line data sample. The second-in-line data sample may, however, be the next available data sample for which a rate change can be scheduled In this example, the audio renderer can then schedule the rate change for the next available data sample and can return, to the source, the timestamp of the corresponding sample for which the rate change has been scheduled. The sideband mechanism can be, and preferably is used to return the timestamp to the source.

One way of scheduling the rate change for the data sample of interest is to associate, with the data sample, a data structure that includes data that describes the rate change. An exemplary data structure is described below.

Once the source has the timestamp associated with the sample for which the rate change has been scheduled in the guiding filter graph, step 1006 issues a rate change command to the other filter graphs for the samples that correspond to the sample for which the rate change has been scheduled. That is, recall that for a particular audio sample bearing a particular timestamp, there will be a corresponding video sample that contains a corresponding timestamp. These timestamps are used by the respective renderers, typically in conjunction with a global clock, to synchronize rendering of the audio and video samples. Here, when the source receives the timestamp of the sample for which the rate change has been scheduled by the audio renderer, it issues the rate change command to the other filter graphs (i.e. the video filter graph and, if present, the sub-picture filter graph), and the rate change command is propagated down the virtual command channel to each component in the filter graph.

When a particular filter graph component receives the rate change command, it uses the timestamp to check its associated buffers to ascertain whether it has the corresponding sample. If it does have the corresponding sample, then the component schedules the rate change for the associated data sample. This can be accomplished, as above, by associating a data structure with the data sample, which data structure can then be used by the filter graph's renderer to implement the rate change. If, on the other hand, the filter component does not have the associated data sample, it uses the virtual command channel to pass along the rate change command to the next component which, in turn, repeats this process.

Figure 11:
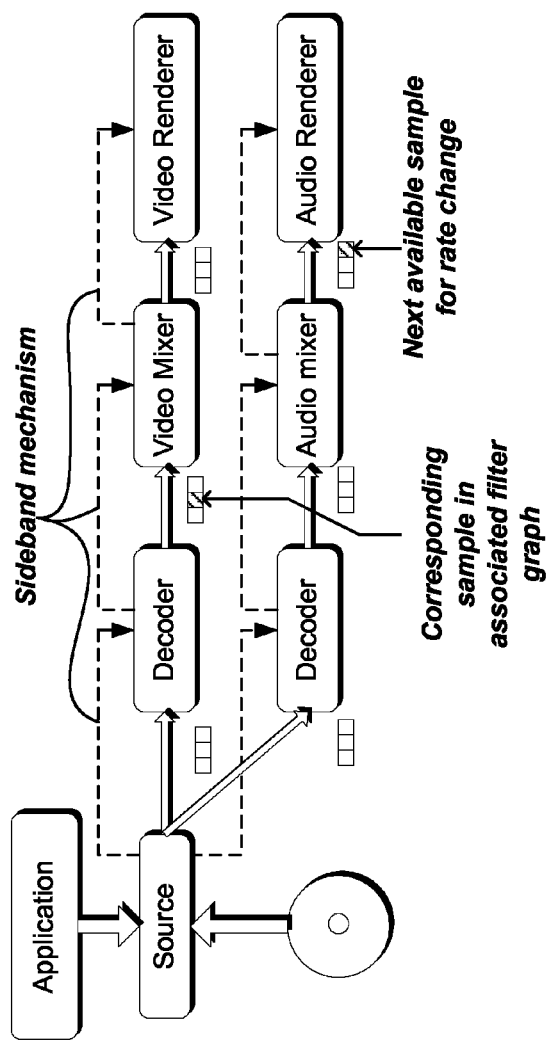
FIG. 11 is a block diagram that illustrates filter graphs in accordance with one embodiment.

As an example, consider FIG. 11. There, the source receives a command from the application to initiate an immediate rate change. Responsive to receiving this command, the source selects the audio filter graph and uses the virtual command channel to request the audio renderer to schedule a rate change at the next available data sample. The audio renderer checks its queue and ascertains that the next available data sample is the one that appears in the illustration with the cross hatching The audio renderer then returns the timestamp associated with this sample to the source. The source receives the timestamp and incorporates it into a rate change command that it issues over the virtual command channel to other corresponding filter graphs which, in this example, comprise the video filter graph.

The command is first issued to the video decoder which, in turn, checks its queue and does not find the sample bearing the timestamp of interest. Accordingly, the video decoder then forwards the command, via the virtual command channel, to the video mixer. Upon checking its queue, the video mixer finds the sample with the timestamp of interest (indicated by the cross hatching) and accordingly schedules the rate change on the sample of interest. As noted above, the rate change can be scheduled by associating, with the sample of interest, a data structure that contains data that describes the rate change, as will become apparent below. It is to be appreciated and understood that while the communication of the rate change command is effected in a serial fashion insofar as it is propagated from component to component, such need not be the case. Rather, it is possible for the source to simultaneously call all of the pertinent components so that the components can check their queues for the sample of interest.

Exemplary Interfaces

As noted above, the sideband communication mechanism that provides the virtual command channel can be implemented as one or more interfaces. The example described below constitutes but one example of a set of interfaces that can provide the functionality that is described above and below. Accordingly, other interfaces can be provided without departing from the spirit and scope of the claimed subject matter.

As an overview to the example about to be described, consider the following. First, the data samples that are allocated for the filter graph support a data structure that is able to indicate, among other things, the fact that a rate change is scheduled for that data sample, and what the particular rate change is. The specific data structure that is described below is embodied in the IRateChangeData interface. The IRateChangeData interface is used to both indicate the presence of a rate change, and to store rate change information related to the sample. Second, an interface IRateChangeControl is provided and is used by components of the filter graph to communicate rate change information downstream to other components. Third, an interface IScheduleRateChange is used by applications to communicate a rate change to the media source or filter.

First consider the IRateChangeData interface which provides the data structure that is used to indicate that a rate change has been scheduled for a particular sample and what the rate change is:

IRateChangeData

The IRateChangeData interface maintains the following information:

```
Structure IRateChangeData
{
    LONG Rate
    REFERENCETIME Location
    DWORD Flags
}
``` where
  LONG Rate—a signed fixed point scale value (×10000) where a negative value indicates reverse playback. A value of 0 indicates that no rate change event is present in this sample (although the flags field may still contain sample information). A truncation point also has a rate value of 0.
  REFERENCETIME Location—The source timestamp location of the rate change or truncation point
  DWORD Flags—A bit wise OR of the following flags
    Flag_ReverseStart—the first sample in a 'reverse playback' group of samples
    Flag_ReverseEnd—the last sample in a 'reverse playback' group of samples
    Flag_ScanMode—part of a video section in forward or reverse scan mode
    Flag_TruncationPoint—the Location specifies that the sample should be truncated at this point. The 'Rate' field is not used.
    Flag_SkipPoint—the Location specifies that the start of the sample up to this point should be discarded. The 'Rate' field is not used.

It should be noted and appreciated that this particular data structure contains other information, such as various flags, that can be used for other purposes, some of which are described below. In this example, LONG rate indicates what the rate change is, and REFERENCETIME Location indicates the location of the rate change (i.e. the source timestamp).

Now consider the IScheduleRateChange interface that is used by the application to schedule a rate change:

IScheduleRateChange

The IScheduleRateChange interface is used by applications to communicate a rate change to the media source or filter:

```
Interface IScheduleRateChange
{
    HRESULT ScheduleRateChange (MediaTimeLocation*
    sourcePosition, LONG Rate__x10000,
    REF__TIME* pActualTime = NULL )
    HRESULT   ScheduleRateChange(  LONG   Rate__x10000,
    REF__TIME* pActualTime = NULL )
}
```

The method ScheduleRateChange( ) requests a rate change insertion at the location specified with respect to the media content.
The source will map the media location into a timestamp that it attaches to the output samples and propagate the rate change using IRateChangeControl:: ScheduleRateChange (position, rate)
The simpler ScheduleRateChange (rate) interface requires that the source internally query the downstream components for the current renderer position that is capable of performing the rate change.

Both methods return the actual timestamp of the rate change. This value is passed to the media processor to propagate the rate change request through the pipeline if the method returns E_NOT_IN_QUEUE.

Now consider the IRateChangeControl interface that is used by components of the filter graph (i.e. the source and downstream components) to communicate a rate change with one another:

IRateChangeControl

The IRateChangeControl interface communicates information with downstream components:

```
Interface IRateChangeControl
{
    HRESULT ScheduleRateChange( REF_TIME sourcePosition,
    LONG Rate__x10000 )
    HRESULT ScheduleRateChangeNow( REF_TIME*
    pReturnedSourcePosition, LONG Rate__x10000 )
    HRESULT ScheduleTruncation( REF_TIME sourcePosition )
    HRESULT ScheduleSkip( REF_TIME sourcePosition )
    HRESULT GetMaxRate( BOOL includeDownstream, DWORD*
    pForwardRate, DWORD* pReverseRate )
    HRESULT GetFurthestPosition(BOOL includeDownstream,
    REF_TIME* pSourcePosition, REF_TIME* pValidUntilPosition )
    HRESULT GetCurrentLocation( REF_TIME* pSourcePosition )
}
```

The method ScheduleRateChange( ) requests a rate change insertion
  The sourcePosition specifies the timestamp to execute the rate change at relative to the source timestamps
  The Rate__$_x$10000 specifies the rate×10000, which is negative if in reverse playback
The method ScheduleRateChangeNow( ) requests an rate change insertion at the next available location and returns the actual location
  The pReturnedSourcePosition returns the timestamp the rate change was scheduled at relative to the source timestamps
  The Rate__$_x$10000 specifies the rate×10000, which is negative if in reverse playback
The method ScheduleTruncation( ) requests a data truncation
  The sourcePosition specifies the timestamp to truncate the sample at
The method ScheduleSkip( ) requests a data skip from the start of the sample
  The sourcePosition specifies the timestamp to skip from the start of the sample to
The method GetMaxRate( ) queries the maximum forward and reverse decode rates
  The pForward and pBackward return positive values indicating the maximum relative forward and backward playback rates
  The includeDownstream flag indicates that the component should recursively include any downstream dependencies in its computation
The method GetFurthestPosition( ) queries the furthest stream time that has not yet been processed
  The pSourcePosition is a return parameter which indicates the current timestamp (relative to the source timestamps) of the output
  The pValidUntilPosition is a return parameter which indicates the timestamp that the source position is valid until (i.e. the range that a rate change can be scheduled at before another GetFurtherPosition request is required)

The GetCurrentLocation method returns the renderer's location in source timestamps (primarily for informational purposes)
For MediaFoundation components
  the Schedule( )methods will return E_SAMPLE_NOT_IN_QUEUE if the desired location is not in the component's buffer
  the upper level component managing the propagation (usually the media processor) should check the next component in the pipeline
  the media processor should walk the pipeline to compute the 'GetFurthestPosition' and 'GetMaxRate' values by setting the 'includeDownstream' flag to FALSE.

Some Implementation Details Using the Interfaces

For scheduling a rate change that is not an immediate rate change, consider the following. A filter, utilizing the IRateChangeControl interface, sends a ScheduleRateChange( ) request the decoder to insert a mid-sample rate change at a specific source timestamp. The decoder determines if it will encounter a sample containing the rate change location. If it has already processed the timestamp or does not handle rate changes, it passes the rate change request to each of its output pins controlled by the input pin. When the decoder handles the request, it internally queues the rate change information to be processed when it receives a sample containing the rate change timestamp. When the sample is encountered, the decoder performs any rate change interpolation and copies the rate change information into the output sample's IRateChangeData interface. In this embodiment, timestamp information in the data stream is not altered directly by the source or any intermediate filters. Each filter simply modifies the stream's contents.

For scheduling a rate change that is an immediate rate change, consider the following. The filter, typically the source filter, decides which stream will be used to guide the rate change (referred to as the "guiding filter graph" in FIG. 10). Usually, this is the stream that cannot gracefully recover from data loss if the rate change occurs in the past and it must recover. In some embodiments, the guiding filter graph is selected to be the one that corresponds to and processes the audio samples. The filter, using the IRateChangeControl interface, sends a ScheduleRateChangeNow( ) request to the guiding stream's decoder to insert a mid-sample rate change at the next available timestamp. The decoder decides if it is the last component that can accomplish the rate change (e.g. by using GetFurthestPosition on the downstream components). Typically, the call is proxied down the component chain to the renderer. The renderer receives the call and queues the rate change and returns the actual queued timestamp. The timestamp must be mapped if the component modifies the timestamps. The actual location (i.e. timestamp) of the rate change is returned to the source filter which then propagates the rate change to the other streams using the ScheduleRateChange( )method.

In implementing the above-described embodiment, it can be advantageous to assign certain responsibilities to certain components comprising the filter graph. In the section immediately below, some of these component responsibilities are discussed. It is to be understood that these responsibilities are not intended to limit application of the claimed subject matter. Rather, these responsibilities are set forth to assist in implementing one or more of the described embodiments.

Component Responsibilities

In general, the source is responsible for generating a continuous data stream, the decoder is responsible for modifying the stream, and the renderer will ultimately be the rate change component. If the renderer does not support the rate change mechanisms, then a previous upstream filter is responsible for acting on behalf of the renderer by altering timestamps to perform the rate change.

Source

The source is responsible for generating and managing timestamp information. The source should generate monotonically increasing streams by shifting out timestamp discontinuities and flipping around reverse playback blocks into forward stream blocks and tagging each to be played backwards.

The source also figures out how to implement a user request for rate changes at particular locations. In addition, the source also figures out how to schedule an immediate rate change. The source can schedule immediate rate changes by using the ScheduleRateChangeNow( )method of the IRateChangeControl interface described above, and propagating the rate change command to other filter graphs using the ScheduleRateChange( )method of the IRateChangeControl interface. Alternately, the source can schedule an immediate rate change by querying the downstream filters' locations and deciding where to schedule the actual change.

Since samples are sent out with varying formats (e.g. forward versus reverse samples), the source can maintain a block (e.g. a GOP or VOBU) history of the most recent direction change. A rate change in a different direction can only occur after the most recent direction change.

Decoder and Intermediate Components

The decoder primarily acts as a stream preprocessor to aid the renderer (e.g. by cutting the bit rate, adding data for slow motion, and the like). When receiving a rate change, the decoder performs as much interpolation as possible. It can also pass the rate change onto the next filter for subsequent processing.

If the next filter (usually the renderer) does not support rate changes, then the decoder can modify its output timestamps to perform the rate change.

Renderer

The renderer ultimately implements rate change. It computes the effective presentation timestamp (PTS) of a sample after the rate change. It also maintains a rate change history so that it can handle salvage/failure situations (e.g. by dropping frames or audio blocks, increasing the frame rate) when, for example, a rate change cannot be done, or the renderer receives a rate change request that should have occurred in the past.

Furthermore, if the renderer can perform some buffering of output frames, then the renderer can actually perform the reverse playback using acceleration techniques. The renderer will receive reverse order samples from the decoder and begin recording or caching the decoded frames. Once the end of the reverse block has been received, the cached frames can be rendered in reverse order.

TimeStamp Manager for Renderers

The timestamp management code can be abstracted into a rate change management function that the renderer can use to map input timestamps (and rate change requests and possibly the current clock location) into an output timestamp for the sample.

Rate Changes for Data That is Not Aligned

Figure 12:
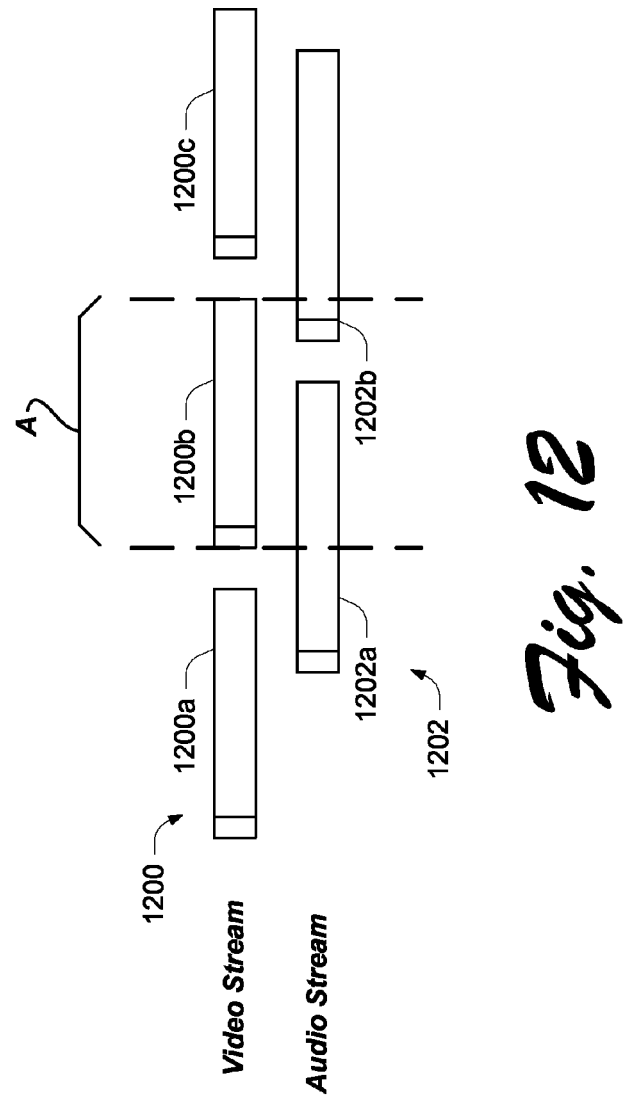
FIG. 12 is a block diagram that illustrates a multimedia stream with unaligned component streams.

Some types of data have individual constituent stream components, such as video and audio components, that are not aligned in a manner that facilitates implementing rate changes. Such data types include, for example, ATSC MPEG-2 streams. As an example, consider FIG. 12. There, video and audio streams 1200, 1202 respectively, are shown.

Video stream 1200 comprises individual blocks 1200*a*, 1200*b*, and 1200*c*. Each of these blocks is independently self-contained and can be decoded without any reliance on other blocks. Similarly, audio stream 1202 comprises individual blocks 1202*a* and 1202*b*. Each of these blocks is independently self-contained and can be decoded without any reliance on other blocks.

Within each individual block, however, there can be interdependencies that affect how a block is decoded. For example, in an MPEG-2 video block, there are individual frames or pictures that have dependencies on frames or pictures that come before and/or after it. Similarly, within an audio block, individual block components can have dependencies on preceding components within the block.

For example, in reverse playback the content needs to be broken into disjoint blocks that are to be played in reverse order. This requires playing an interval (block) then the previous interval and so on. In fast forward playback, brief intervals of data may be needed if the playback is quickly skipping forwards.

Now consider that a user indicates to an application that they want to implement a rate change over the range indicated at A. Note that the location of the beginning of the rate change coincides with a so-called clean point on the video stream. This means that the video stream could begin to be decoded and rendered at this location. However, because of the nature of the way that the individual streams are multiplexed together, there is not a corresponding clean point at the same location for the audio stream. That is, the beginning location for the rate change falls somewhere in the middle of audio block 1202*a*. Accordingly, it is quite likely that the audio stream will not be able to be properly decoded for incorporation in the rate change.

To address this situation, the embodiment about to be described utilizes the notion of skip points and truncate points, and incorporates these points in a manner that enables rate changes to be intelligently implemented when data streams are not aligned at their individual clean points.

Figure 13:
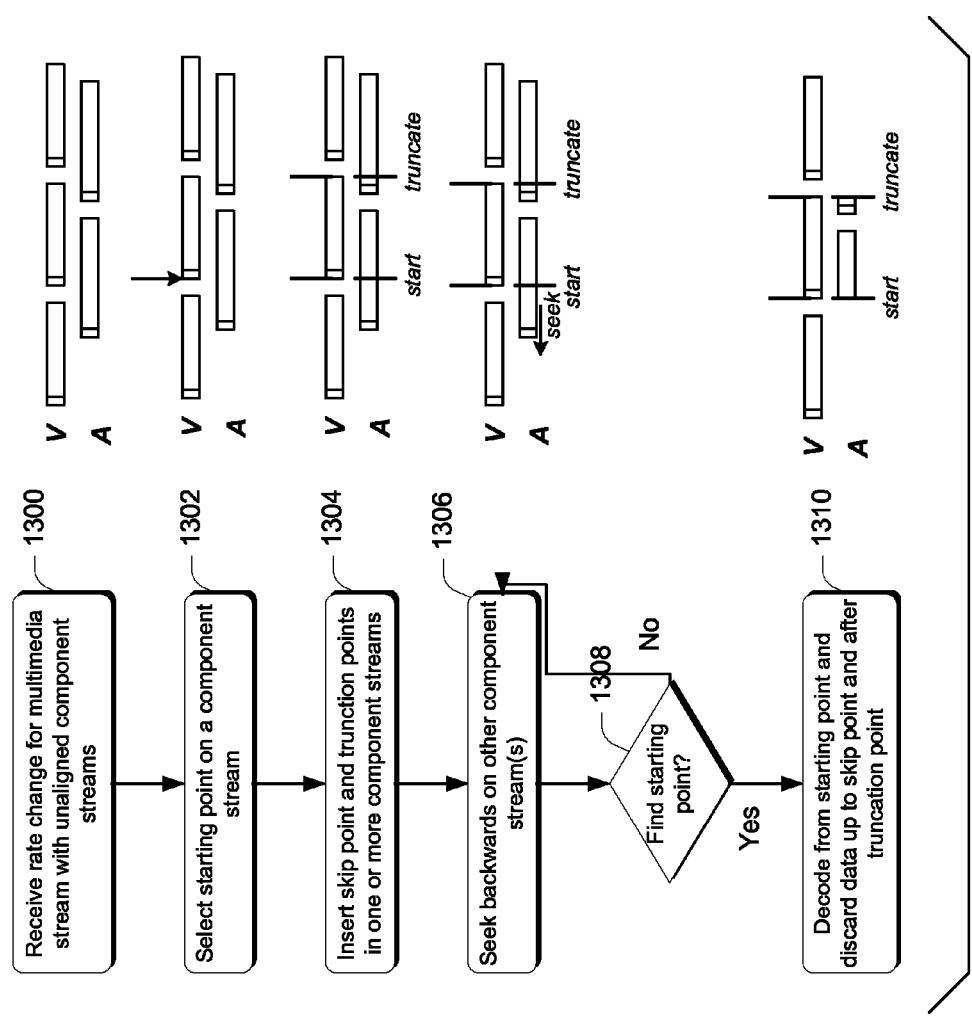
FIG. 13 is a flow diagram that describes steps in a method in accordance with one embodiment.

As an example, consider FIG. 13 which is a flow diagram that describes a method in accordance with one embodiment. The method can be implemented in any suitable hardware, software, firmware or combination thereof. In the illustrated and described embodiment, the method is implemented in software in connection with a filter graph, such as the one shown and described above. Notice also that to the right of the illustrated flow chart appears a diagrammatic representation of a portion of a multimedia stream having a video component (V) and an audio component (A). The depicted multimedia stream is intended to assist the reader in visualizing the steps that are about to be described. Since the streams may be multiplexed (i.e. interleaved as short spans or 'packets') into a single stream, the diagram shows the temporal positions of the streams within the multiplexed stream.

Step 1300 receives a rate change command for a multimedia stream having unaligned component streams. For example, the multimedia stream to the right of box 1300 can be seen to have stream components whose starting points or clean points do not coincide in location.

Step 1302 selects a starting point on a component stream referred to as a "primary stream". This is indicated by the downward pointing arrow. In this example, the starting point coincides with a clean point on the video stream. Selecting a starting point on one of the component streams facilitates decoding of all of the component streams so that the rate change can be implemented, as will become apparent below. Since streams may be multiplexed into a single data stream, the starting point is the multiplexed data location of each stream.

Step 1304 inserts skip points and truncation points in one or more of the component streams. In the illustrated example, the skip point coincides in location to the clean point of the video block. If blocks of content are to be displayed continuously, the truncation point would coincide in location to the clean point of the next illustrated video block. The truncation location might not be specified if an application desires to perform a frame accurate seek.

Step 1306 seeks backwards on the other component streams, i.e. the secondary streams, and step 1308 ascertains whether a starting point or clean point is found. If the streams are multiplexed into a single data stream, then the source simply has to seek backwards then parse forwards until it encounters a packet from each of the streams. If the location of any streams is before the clean point, then the source seeks back further and repeats the process. This step can be implemented by the source. If a starting point or clean point is not found, then the method loops back to step 1306. If a starting point is found (the "Yes" branch), then step 1310 decodes the stream from the starting point and discards data both up to the skip point and after the truncation point.

In this manner, the rate change can be implemented over the properly decoded range specified by the user, without having to drop portions of a stream component whose starting or clean points do not align with the primary stream component. That is, the above-described processing can effectively generate a logical block for the data across all of the streams. With the generation of the logical block of data, the filter graph can implement the rate change using the logical block.

In one implementation, the skip and truncation points can be implemented using the interfaces described above. Specifically, notice that the IRateChangeData interface supports two flags: Flag_TruncationPoint and Flag_SkipPoint. The Flag_TruncationPoint specifies that the particular sample should be truncated after this point (i.e. have its data discarded after this point). The Flag_SkipPoint specifies a location relative to which data from the start of the sample up to this location should be discarded.

Skip points and truncation points can be implemented using, respectively, the methods ScheduleSkip( ) and ScheduleTruncation( ) of the IRateChangeControl interface above. Using these methods enables timestamps to be specified relative to which skipping and truncation takes place. Thus, for example, as the source component reads the multimedia stream and receives a rate change command from the application, it can insert the skip and truncation points, using the above-described methods, so that the decoder or some other component can skip data prior to the clean point and truncate data samples after the truncation point as indicated. If the streams are multiplexed, then the source needs to seek to a position in the multiplexed stream before any blocks start in all streams. Furthermore, the demultiplexer can discard packets before the clean point.

EXAMPLES

The location of the corresponding sample and/or the nature of the rate change can affect how rate changes occur. To assist in understanding some of these situations, the following examples are provided: (1) the user requests a rate change at a particular location; (2) the user requests a rate change to occur immediately (i.e. 'now'); (3) the sample is at the source; (4) the sample is at the decoder; and, (5) the sample is at the renderer.

The User Requests a Rate Change at a Particular Location

Figure 14:
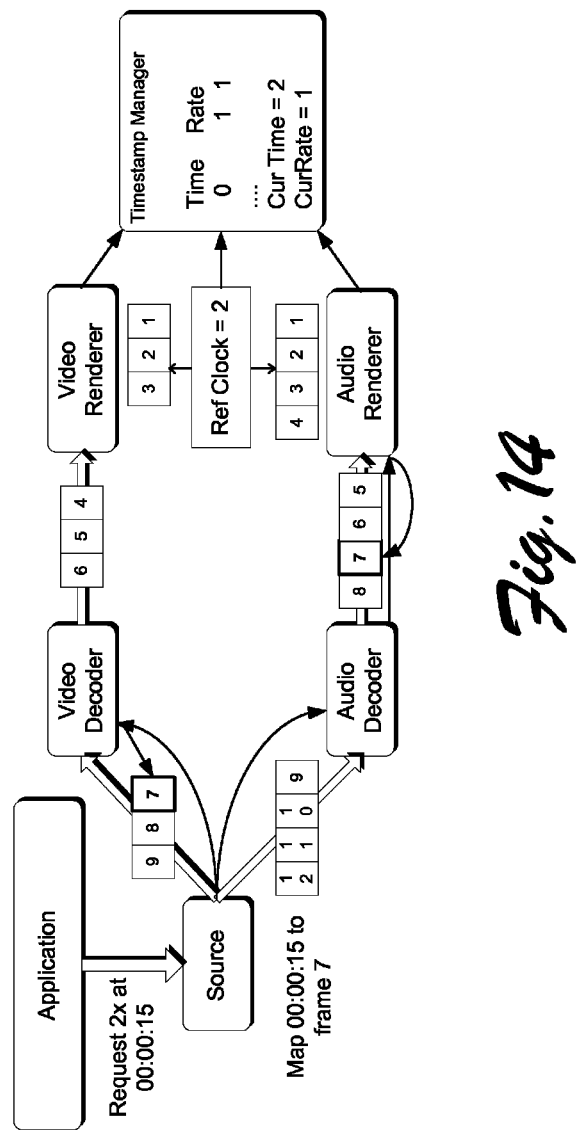
FIG. 14 is a block diagram that illustrates filter graphs in accordance with one embodiment.

FIG. 14 illustrates a filter graph in which a rate change request is made by the user at a specified location. Suppose that twelve frames of content have been sent to the renderers in various block sizes, and that the user has requested a rate change of 2× at time 00:00:15. In this example, the source maps the content specific location (i.e. 00:00:15) to the corresponding output sample timestamp 7. The property sets are sent to each output pin to request that the next filter inserts a rate change. The video decoder has buffered sample 7, so it attaches the rate change information to sample 7 using, for example, the data structure described above. The audio decoder has already processed sample 7, so it passes the property sets to the audio renderer. The audio renderer will break the next buffer into two sections to be played at different rates. Each renderer consults the timestamp manager to map each input timestamp into an output timestamp.

The User Requests a Rate Change to Occur Immediately

Consider now that the user requests a rate change to occur immediately. In this example, and using the interfaces described above, there are two options available for the filter graph.

The first option is for the filter graph to utilize the ScheduleRateChangeNow( ) method of IRateChangeControl interface as described above. Here, as described above, the source filter chooses a guiding stream (or filter graph) and calls ScheduleRateChangeNow( ) which returns the actual source time (i.e. timestamp) for which the rate change was scheduled. The source filter then propagates the rate change request to all of the other components in the other filter graphs using the ScheduleRateChange( ) method and the returned source time (i.e. timestamp).

The second option is for the filter graph to utilize the GetFurthestPosition( ) method of the IRateChangeControl interface. Specifically, using this method, the source filter can query the next available timestamp and the amount of time available until it occurs. Using this timestamp, it can then propagate a rate change down the graph.

Figure 15:
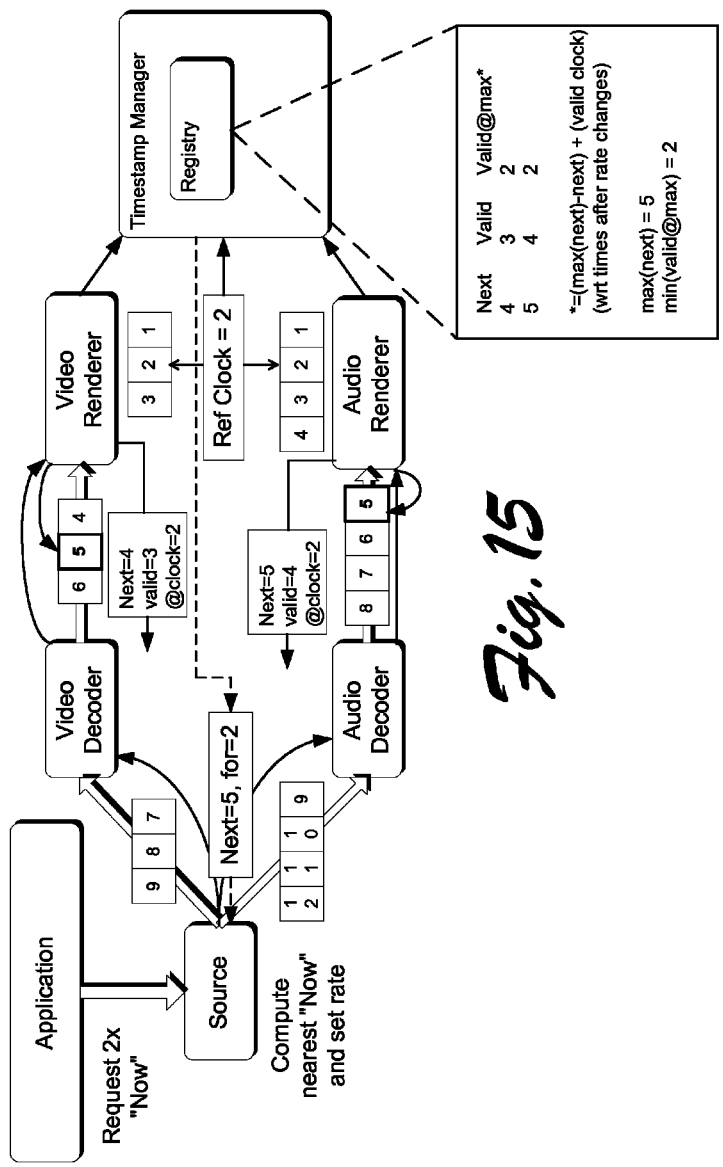
FIG. 15 is a block diagram that illustrates filter graphs in accordance with one embodiment.

The next available timestamp can be computed by the timestamp manager or in a distributed recursive fashion. The timestamp manager has the advantage of not requiring each filter along the chain to account for rate changes to the stream (by querying each queued sample for rate changes). As an example, consider FIG. 15.

Here, each renderer registers and updates the timestamp manager with its current progress. The timestamp manager can compute the next available time to schedule a rate change, and can pass it back to the source (e.g. at frame 5, with 2 frames to propagate the rate change). The source can also find out where the renderers are (in terms of source timestamps), and can compute the source location to the application. The timestamp manager extrapolates the location of each renderer and returns it to the source.

The Sample is at the Source

Figure 16:
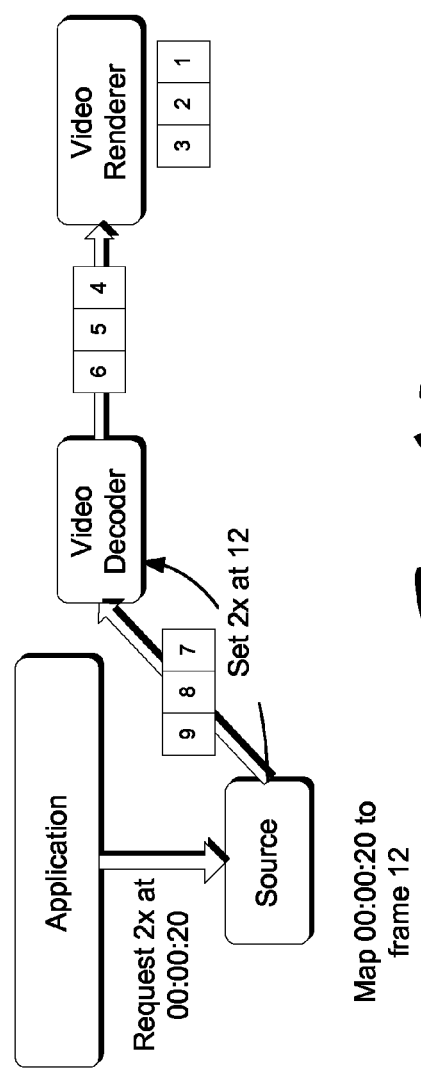
FIG. 16 is a block diagram that illustrates a filter graph in accordance with one embodiment.

Referring to FIG. 16, suppose that the application requests a rate change, but the source has not yet produced the sample. In the illustrated figure, assume that the application requests a rate change for sample 12.

The source can either forward the rate change to the decoder or it can queue the rate change to be processed when the sample is actually read. The source can queue the rate changes in an event it wants to allow the application to schedule out of order rate changes which could affect the format of the data sent out.

Any rate changes requested for locations after the current read position will be forwarded to the decoder (see section immediately below).

The Sample is at the Decoder

Figure 17:
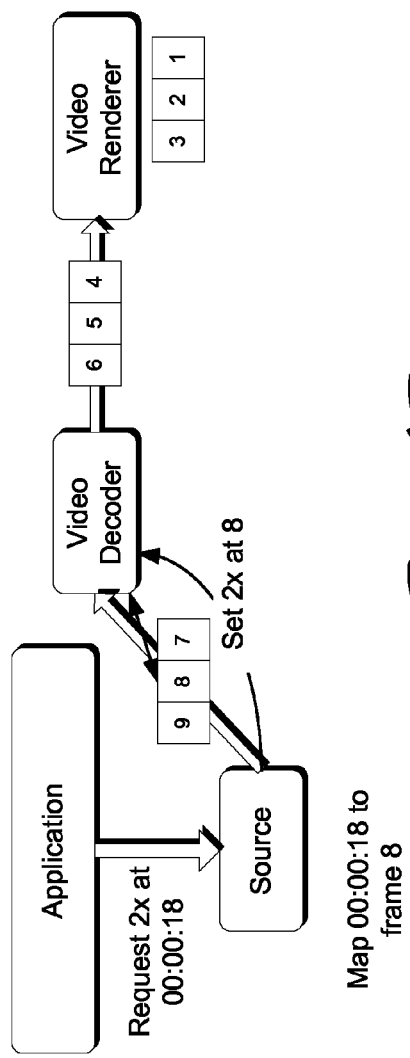
FIG. 17 is a block diagram that illustrates a filter graph in accordance with one embodiment.

Referring to FIG. 17, suppose that the rate change location is located within one of the decoder's buffers. Here, the decoder can queue the rate change until it is ready to produce the output sample corresponding to the input sample 8. If the decoder encounters blocks with reverse direction flags on them, it can either forward the block reversal flags, or process the flags to produce reversed samples.

The queue of rate changes can be sorted by timestamps and is drained as the samples are processed. The decoder can reduce the data stream produced (e.g. by discarding frames), and can optionally modify the output timestamps. It can be more desirable, however, to forward the timestamp modifications to the renderer. If the decoder does not modify the timestamps, then the rate change is recorded on the output sample (using, for example, the data structure described above) and forwarded to the renderer.

If a rate change is to occur on a sample beyond the decoder's input queue, then the rate change request is forwarded to the renderer.

The Sample is at the Renderer

Figure 18:
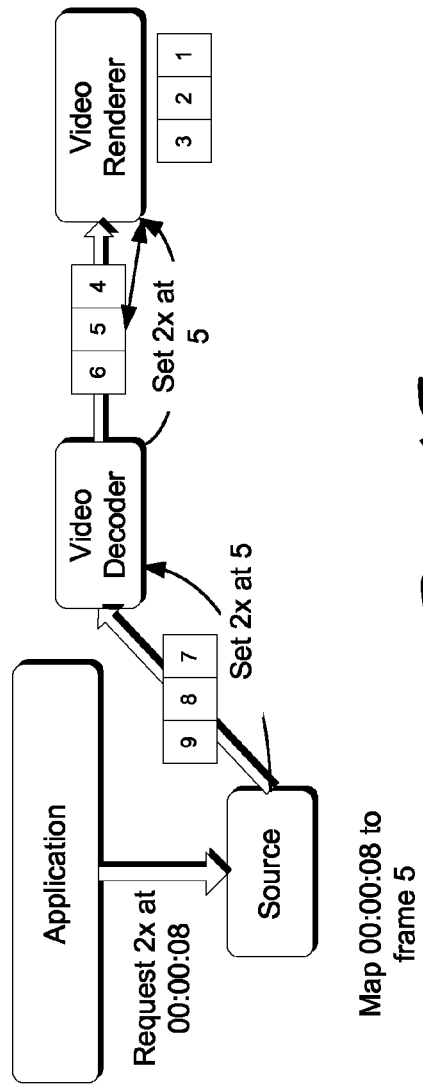
FIG. 18 is a block diagram that illustrates a filter graph in accordance with one embodiment.

Referring to FIG. 18, suppose that the rate change location (here, sample 5) is located within one of the renderer's input buffers. Here, the source queries the pipeline for the furthest forward sample (currently sample 4). The source will forward the request to the decoder since it has already produced timestamp 5. The decoder will detect that it has already produced the sample and forwards it to the renderer. The renderer will queue the rate change until it is ready to produce the output sample corresponding to the input sample 5.

Ideally, only the renderer will modify the timestamps as it processes samples. The renderers can use a common timestamp mapping object to ensure consistent computations to avoid relative stream drift. If the renderer encounters a sample with a reverse playback block, then it must produce samples in reverse order. It can do so by either generating a representative image by truncating the block to a single frame, or it can (partially or fully) buffer the forward decoded image then play it back in reverse order.

CONCLUSION

The methods and systems described above can provide improved methods and systems for processing renderable digital data. Various methods and systems permit digital data, such as video data, audio/video data, audio/video/subpicture data and the like, to be processed in a manner that permits playback in both forward and reverse directions in a manner that enhances the user's experience. Various embodiments can also handle playback rate changes in a manner that can enhance the user's experience.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
   receiving a rate change command for a multimedia stream having at least a primary stream and a secondary stream that are unaligned;
   selecting a first starting point on a first block of data of the primary stream of the multimedia stream;
   inserting a skip point and a truncation point relative to the secondary stream unaligned with the primary stream, wherein the skip point relative to the secondary stream coincides in location with the first starting point on the first block of data of the primary stream and the truncation point relative to the secondary stream coincides in location with a second starting point on a second block of data of the primary stream next to the first block of data of the primary stream;
   processing the secondary stream by discarding data before the skip point and truncating data after the truncation point effective to generate a logical block of data across the primary stream and the secondary stream; and
   implementing the rate change on the logical block of data.

2. The method of claim 1, wherein the first starting point coincides with a clean point on the primary stream.

3. The method of claim 1, wherein inserting the skip point and the truncation point is performed by specifying timestamps associated with data samples on which skipping and truncation is to take place.

4. The method of claim 3, wherein inserting the skip point and the truncation point and specifying the timestamps are performed by a source component that is configured to read multimedia content.

5. The method of claim 1, wherein the primary stream and the secondary stream include at least one audio stream and at least one video stream, the method further comprising using a filter graph to implement the rate change on the logical block of data.

6. One or more computer storage devices comprising instructions, that when executed by a processor, perform operations comprising:
   receiving a rate change command for a multimedia stream having an audio stream and a video stream unaligned with the audio stream;
   identifying one of the audio stream or the video stream as a primary stream, and the other of the audio stream or the video stream as a secondary stream;
   selecting a starting point for the primary stream;
   inserting a skip point and a truncation point in the secondary stream, wherein the skip point coincides in location with the starting point for the primary stream;
   processing the secondary stream by discarding data before the skip point and truncating data after the truncation point to generate a logical block of data for both the primary stream and the secondary stream; and
   implementing the rate change on the logical block of data.

7. The one or more computer storage devices of claim 6, wherein the starting point coincides with a clean point on the primary stream.

8. The one or more computer storage devices of claim 6, wherein inserting the skip point and the truncation point is performed by specifying timestamps associated with data samples on which skipping and truncation is to take place.

9. The one or more computer storage devices of claim 8, wherein inserting the skip point and the truncation point and specifying the timestamps are performed by a source component that is configured to read multimedia content.

10. One or more devices comprising: one or more computer storage media; one or more processors; first instructions, embodied on the one or more computer storage media and operable by the one or more processors, to receive a rate change command for a multimedia stream having a plurality of unaligned component streams; second instructions, embodied on the one or more computer storage media and operable by the one or more processors, to select a starting point on a primary stream of the multimedia stream; third instructions, embodied on the one or more computer storage media and operable by the one or more processors, to insert a skip point and a truncation point relative to a secondary stream unaligned with the primary stream, wherein the skip point coincides in location with the starting point on the primary stream; fourth instructions, embodied on the one or more computer storage media and operable by the one or more processors, to process the secondary stream by discarding data before the skip point and truncating data after the truncation point effective to generate a logical block of data for the primary stream and the secondary stream; and fifth instructions, embodied on the one or more computer storage media and operable by the one or more processors, to implement the rate change on the logical block of data.

11. The one or more devices of claim 10, wherein the starting point coincides with a clean point on the primary stream.

12. The one or more devices of claim 10, wherein inserting the skip point and the truncation point is performed by specifying timestamps associated with data samples on which skipping and truncation is to take place.

13. The one or more devices of claim 12, wherein inserting the skip point and the truncation point and specifying the timestamps are performed by a source component that is configured to read multimedia content.

14. The one or more devices of claim 10, wherein the plurality of unaligned component streams include at least one audio stream and at least one video stream, and the one or more devices further comprise a filter graph to implement the rate change on the logical block of data.

* * * * *